US012038667B2

(12) United States Patent
Yang et al.

(10) Patent No.: US 12,038,667 B2
(45) Date of Patent: Jul. 16, 2024

(54) PROGRAMMING EMERGENT SYMMETRIES WITH SADDLE-SPLAY ELASTICITY

(71) Applicants: THE TRUSTEES OF THE UNIVERSITY OF PENNSYLVANIA, Philadelphia, PA (US); TRUSTEES OF TUFTS COLLEGE, Medford, MA (US); SHEFFIELD HALLAM UNIVERSITY, Sheffield (GB)

(72) Inventors: Shu Yang, Swarthmore, PA (US); Yu Xia, Swarthmore, PA (US); Timothy J. Atherton, Boston, MA (US); Douglas J. Cleaver, Chesterfield (GB); Andrew A. Debenedictis, Somerville, MA (US); Dae Seok Kim, Philadelphia, PA (US)

(73) Assignees: THE TRUSTEES OF THE UNIVERSITY OF PENNSYLVANIA, Philadelphia, PA (US); TRUSTEES OF TUFTS COLLEGE, Medford, MA (US); SHEFFIELD HALLAM UNIVERSITY, Sheffield (GB)

( * ) Notice: Subject to any disclaimer, the term of this patent is extended or adjusted under 35 U.S.C. 154(b) by 28 days.

(21) Appl. No.: 17/435,407

(22) PCT Filed: Mar. 4, 2020

(86) PCT No.: PCT/US2020/020875
§ 371 (c)(1),
(2) Date: Sep. 1, 2021

(87) PCT Pub. No.: WO2020/180922
PCT Pub. Date: Sep. 10, 2020

(65) Prior Publication Data
US 2022/0179281 A1 Jun. 9, 2022

Related U.S. Application Data

(60) Provisional application No. 62/813,627, filed on Mar. 4, 2019.

(51) Int. Cl.
*G02F 1/31* (2006.01)

(52) U.S. Cl.
CPC .................................. *G02F 1/31* (2013.01)

(58) Field of Classification Search
None
See application file for complete search history.

(56) References Cited

U.S. PATENT DOCUMENTS

| 4,272,157 | A | * | 6/1981 | Collins, Jr. | ........... G02F 1/0121 359/239 |
| 5,066,104 | A | | 11/1991 | Mohebban et al. | |

(Continued)

FOREIGN PATENT DOCUMENTS

| DE | 10244452 A1 | 4/2004 |
| WO | 2007/046274 A1 | 4/2007 |
| WO | 2017/035291 A1 | 3/2017 |

OTHER PUBLICATIONS

Allender, D, et al., "Determination of the liquid-crystal surface elastic constant K24," Physical review letters, vol. 67, Issue 11, Sep. 9, 1991, pp. 1442-1445.

(Continued)

*Primary Examiner* — Ashok Patel
(74) *Attorney, Agent, or Firm* — BakerHostetler

(57) ABSTRACT

Multi-state switchability is highly desirable in optoelectronic devices. For liquid crystal (LC) based devices, the stability of any configuration is achieved through a balance between imposed interactions and the LC's orientational elasticity. In most cases, the latter acts to resist deformation. By combining surface topography and chemical patterning, (Continued)

provided here are the effects of saddle-splay orientational elasticity, a property that, despite being intrinsic to all LCs, is routinely suppressed. Utilizing theory and continuum elastic calculations, provided here are example conditions for which, even using generic, achiral LC materials, spontaneously broken surface symmetries develop. Also provided are multi-stable devices in which a weak, but directional, applied field switches between spontaneously-polar surface state domains. The disclosed approach is useful in low-field and fast-switching optoelectronic devices, beyond those attainable by current technologies.

14 Claims, 16 Drawing Sheets

(56) References Cited

U.S. PATENT DOCUMENTS

| | | | |
|---|---|---|---|
| 5,399,291 | A | 3/1995 | Janulis et al. |
| 6,853,478 | B2* | 2/2005 | Vincent ............... G02F 1/061 |
| | | | 365/151 |
| 2001/0017685 | A1 | 8/2001 | Park |
| 2007/0040780 | A1 | 2/2007 | Gass et al. |

OTHER PUBLICATIONS

Araki, T., et al., "Memory and topological frustration innematic liquid crystals confined in porous materials," Nature Materials, vol. 10, Mar. 20, 2011, pp. 303-309.
Cestari, M., et al., "Molecular field theory with atornistic modeling for the curvature elasticity of nematic liquid crystals," The Journal of Chemical Physics, vol. 131, Issue 5, Aug. 3, 2009.
Crawford, G., et al., "Surface elastic and molecular-anchoring properties of nematic liquid crystals confined to cylindrical cavities," Physical review. A, Atomic, molecular, and optical physics vol. 45, Jun. 15, 1992, pp. 8693-8708.
Davidson, A. J., et al., "Defect trajectories and domain-wall loop dynamics during two-frequency switching in a bistable azimuthal nematic device,". Physical review. E, Statistical, nonlinear, and soft matter physics, vol. 81, Issue 05, May 27, 2010.
Davidson, Z. S., et al., Chiral structures and defects of lyotropic chromonic liquid crystals induced by saddle-splay elasticity, Physical Review E, vol. 91, May 22, 2015, pp. 050501-1-050501-5.
DE Gennes, P. G. et al., "The Physics of Liquid Crystals," Physics Today, vol. 4, 1995, pp. 1.
Debenedictis, A. et al., "Competition of lattice and basis for alignment of nematic liquid crystals," Physical Review E, vol. 92, pp. 11, (2015).
Dunmur, D., et al., "Soap, Science, and Flat-Screen TVs: A History of Liquid Crystals," OUP Oxford, 2011.
Ericksen, J. L. "Inequalities in liquid crystal theory," The Physics of Fluids, vol. 9, pp. 1205-1207 (1966).
Frank, F. C. I. "Liquid crystals. On the theory of liquid crystals. Discuss," Discussion of the Faraday Society, vol. 25, 1958, pp. 19-28.
Hendrikx, M. et al. "Re- and Preconfigurable Multistable Visible Light Responsive Surface Topographies," Small, vol. 14, Issue 50, Dec. 13, 2018, pp. 7.
Hilsum, C., "Flat-panel electronic displays: a triumph of physics, chemistry and engineering," Proceedings of the Royal Society A: Mathematical, Physical and Engineering Science, vol. 368, pp. 1027-1082 (2010).
Jones, J. C., "The Zenithal Bistable Display: From concept to consumer," Journal of the Society for Information Display, vol. 16, p. 143-154, (2008).
Kim, D. S., et al., "Mosaics of topological defects in micropatterned liquid crystal textures," Science advances, vol. 4, Nov. 23, 2018, pp. 1-8.

Kim, J.-H., et al ., "Tristable nematic liquid-crystal device using micropatterned surface alignment," Nature, vol. 420, Nov. 14, 2002, pp. 159-162.
Kitson, S. et al., "Controllable alignment of nematic liquid crystals around microscopic posts: Stabilization of multiple states" Applied Physics Letters, vol. 80, Issue 19, May 7, 2002 , pp. 3635-3637.
Kos, Ž. et al., "Relevance of saddle-splay elasticity in complex nematic geometries," Soft Matter, vol. 12, Nov. 13, 2015, pp. 1313-1323.
Kralj, S., et al., "Periodic saddle-splay Freedericksz transition in nematic liquid crystals," The European Physical Journal E, vol. 17, Mar. 24, 2005, pp. 37-44.
Lavrentovich, O., et al., Stripe domain phase of a thin nematic film and the K13 divergence term, Physical review letters, vol. 73, No. 7, Aug. 15, 1994, pp. 979-982.
Madhusudana, N. V. et al., "Elasticity and Orientational Order in Some Cyanobiphenyls: Part IV Reanalysis of the Data," Molecular Crystals and Liquid Crystals, vol. 89, Dec. 12, 2006, pp. 249-257.
Nastishin, Y. A., "Nematic polar anchoring strength measured by electric field techniques," Journal of Applied Physics, vol. 86, No. 8, Oct. 15, 1999, pp. 4199-4213.
Ondris-Crawford, et al., "Curvature-induced configuration transition in confined nematic liquid crystals," Physical review letters, vol. 70, Issue 2, Jan. 11, 1993, pp. 194-197.
Ong, H. L., et al., "Multistable orientation in a nematic liquid crystal cell induced by external field and interfacial interaction," Journal of Applied Physics 55, 2809-2815(1984).
Oseen, C. W., "The theory of liquid crystals," Transactions of the Faraday Society, vol. 29, pp. 883-899 (1933).
Pairam, E., et al., "Stable nematic droplets with handles," Proceedings of the National Academy of Sciences, vol. 110, No. 23, Jun. 4, 2013, pp. 9295-9300.
Polak, R. D., et al., "Optical determination of the saddle-splay elastic constant," Physical Review E, vol. 49, Issue 2, Feb. 1, 1994, pp. R978-R981.
Poulin, P., el al., "Novel Colloidal Interactions in Anisotropic Fluids," Science (New York, N.Y.), vol. 275, Mar. 21, 1997, pp. 1770-1773.
Selinger, J. V., "Interpretation of saddle-splay and the Oseen-Frank free energy in liquid crystals," Liquid Crystals Review, vol. 6, Issue 2, Mar. 1, 2019, pp. 129-142.
Serra, F., et al., "The emergence of memory in liquid crystals," Materials Today, vol. 14, Issue 10, Oct. 2011, pp. 488-494.
Sidky, H., et al., "In Silico Measurement of Elastic Moduli of Nematic Liquid Crystals" Physical review letters, vol. 120, issue 10, Mar. 1, 2018, pp. 6.
Skarabot, M., et al., "Surface anchoring of nernatic liquid crystal 8OCB on a DMOAP-silanated glass surface," Liquid Crystals, vol. 33, Issue 5, Feb. 20, 2007, pp. 581-585.
Smalyukh, I. I., et al., "Three-dimensional structure andmultistable optical switching of triple-twisted particle-like excitations in anisotropic fluids," Nature Materials, vol. 9, Dec. 6, 2009, pp. 139-145.
Sparavigna, A., et al., "Periodic stripe domains and hybrid alignment regime in nematic liquid crystals: Threshold analysis," Physical Review E, vol. 49, No. 2, Feb. 1994, pp. 1344-1352.
Spencer, T. J., et al., "Zenithal bistable device: Comparison of modeling and experiment," Physical Review E, vol. 82, Aug. 2010, pp. 43.
Tiribocchi, A., et al., "Switching and defect dynamics in multistable liquid crystal devices," Applied Physics Letters, vol. 97, Issue 14, Oct. 4, 2010, pp. 3.
Tran L. et al., "Lassoing saddle splay and the geometrical control of topological defects," Proceedings of the National Academy of Sciences of the United States of America, vol. 113, May 26, 2016, pp. 7106-7111.
Tsakonas, C., et al., "Multistable alignment statesin nematic liquid crystal filled wells," Applied Physics Letters, vol. 90, pp. 111913 (2007).
Vilfan, M., "Azimuthal and zenithal anchoring of nematic liquid crystals," Physical Review E, vol. 68, Sep. 12, 2003, pp. 031704-1-031704-5.

(56) References Cited

OTHER PUBLICATIONS

Vilfan, M., et al., "Dynamic light scattering measurements of azimuthal and zenithal anchoring of nematic liquid crystals," Physical Review E, vol. 65, May 2002, pp. 041712-1-041712-7.

Xia, Y., "Programming Emergent Symmetries With Saddle Splay Elasticity," Nature Communications, vol. 10, Issue 5, Nov. 2019, pp. 10.

Yokoyama, H. et al., "A novel method for determining the anchoring energy function at a nematic liquid crystal-vvall interface from director distortions at high fields," Journal of Applied Physics, vol. 57, Issue 10, Jun. 4, 1998, pp. 4520-4526.

Zhang, J., et al., "Compartmentalized Multistable Liquid Crystal Alignment," Advanced Materials, vol. 22, Issue 9, Mar. 5, 2010, pp. 961-965.

Zumer, S. et al., "Influence of K24 on the structure of nematic liquid crystal droplets," Liquid Crystals, vol. 12, Issue 4, Apr. 17, 1992, pp. 613-624.

\* cited by examiner

FIG. 1A
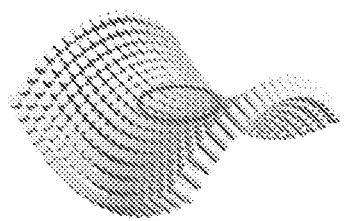
FIG. 1B
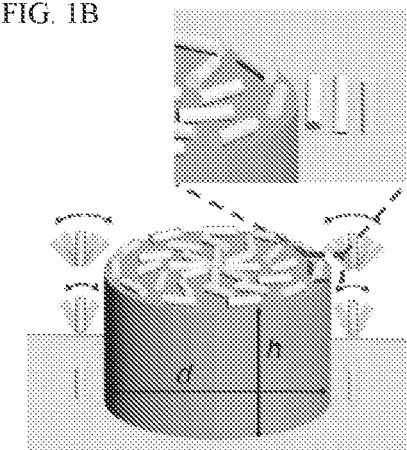
FIG. 1K
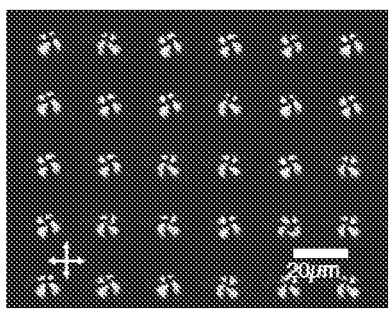
FIG. 1L
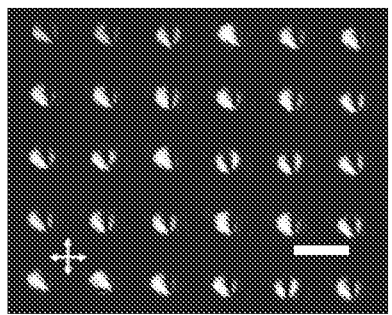
FIG. 1C  Pinwheel (P)
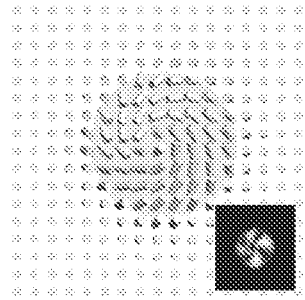
FIG. 1D  Radial (R)
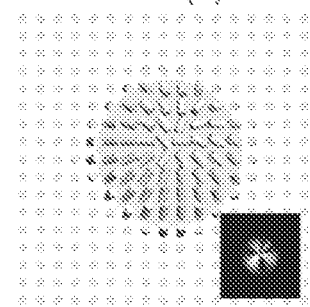
FIG. 1E  Boojum (B)
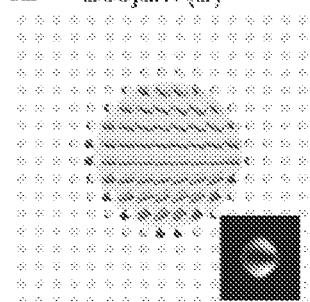
FIG. 1F  Uniform (U)
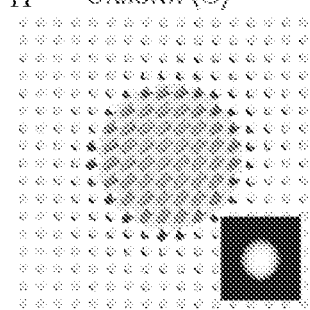
FIG. 1G
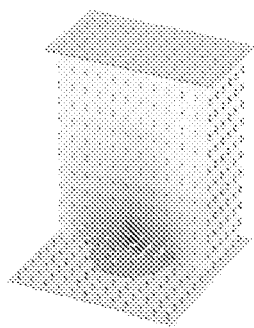
FIG. 1H
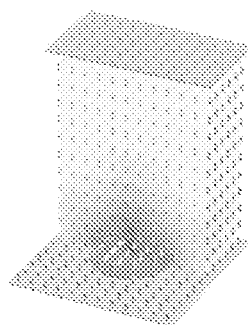
FIG. 1I
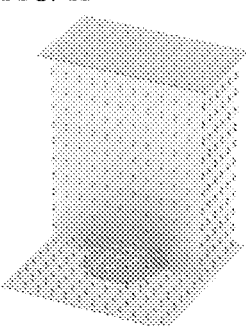
FIG. 1J
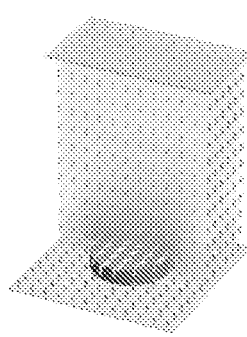

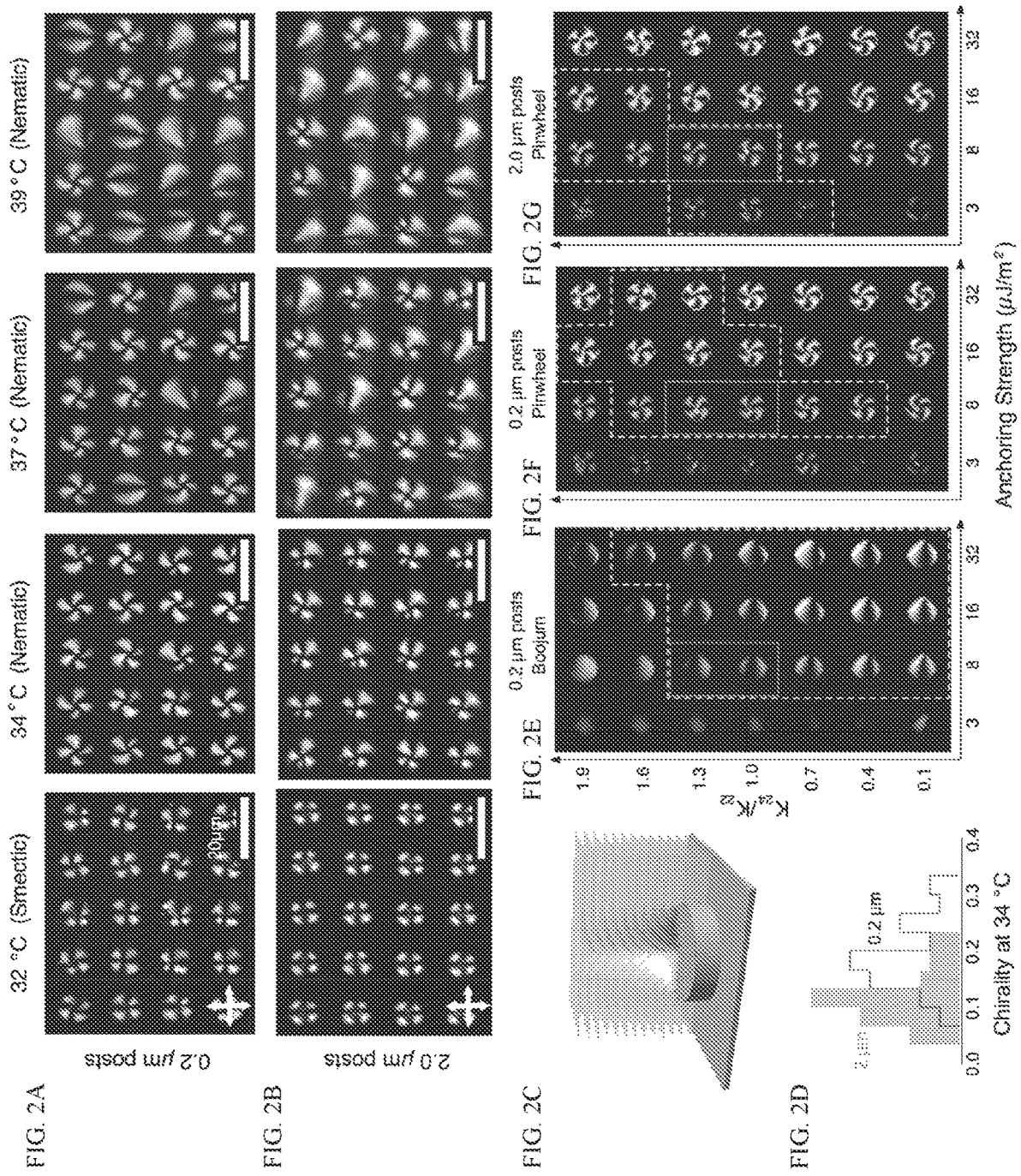

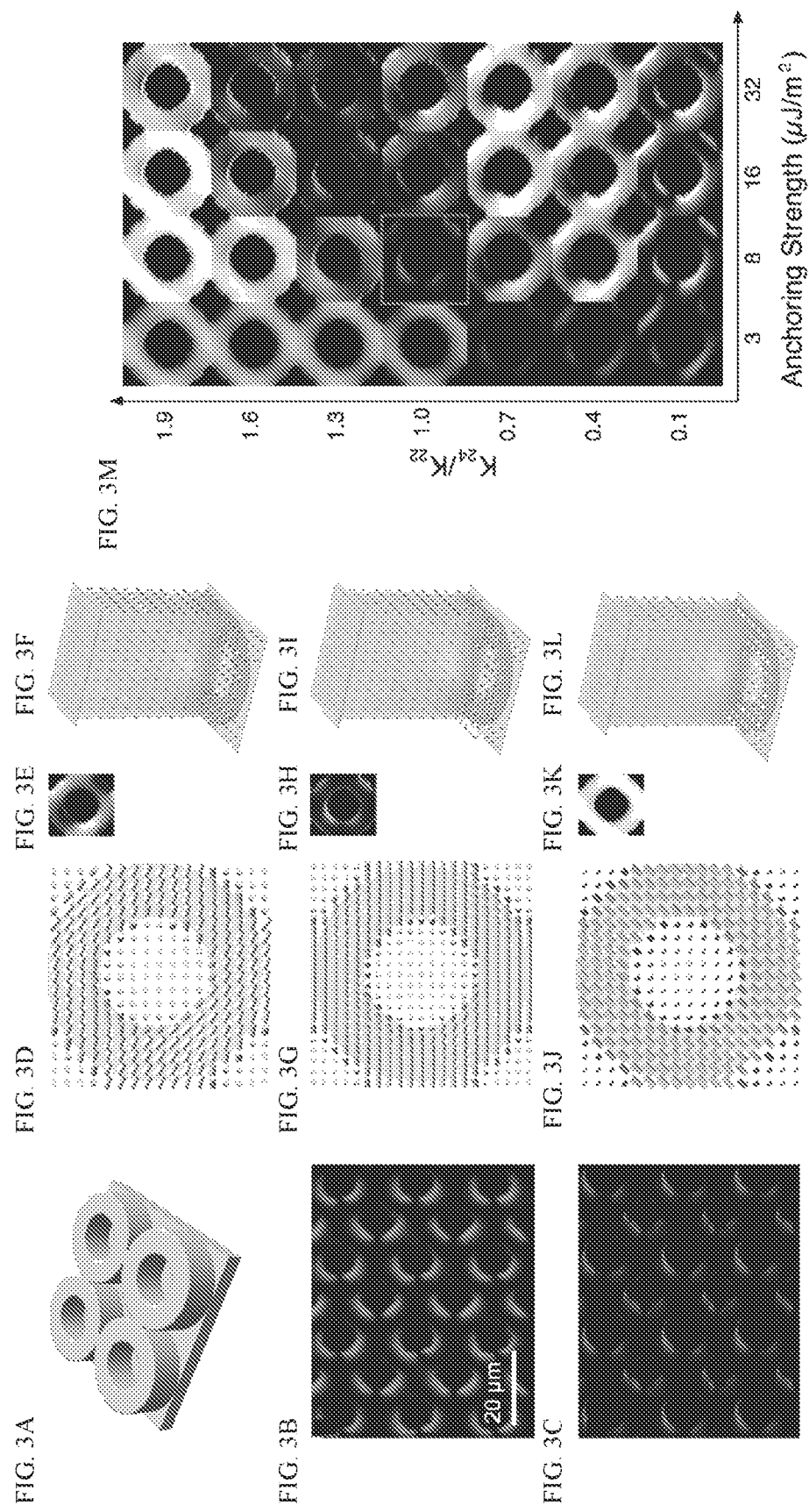

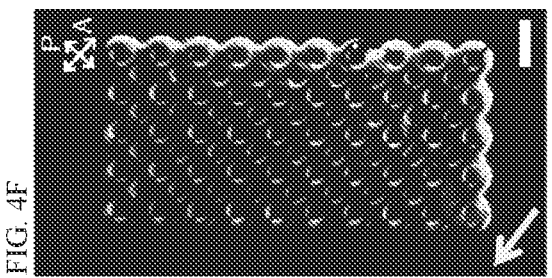
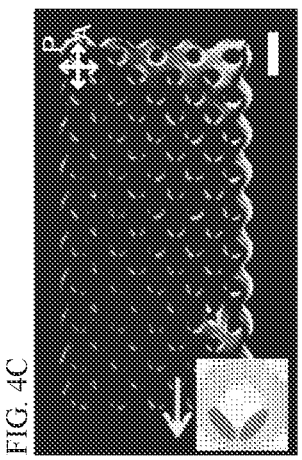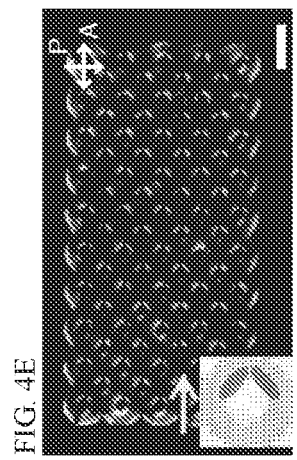
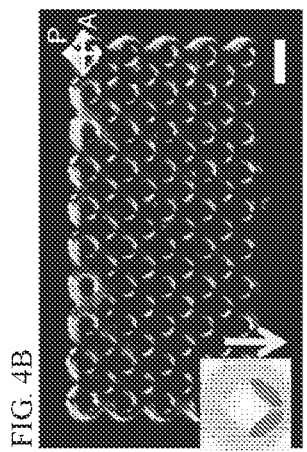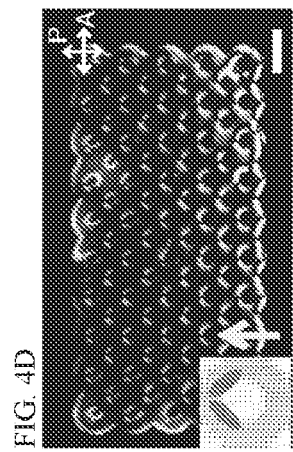
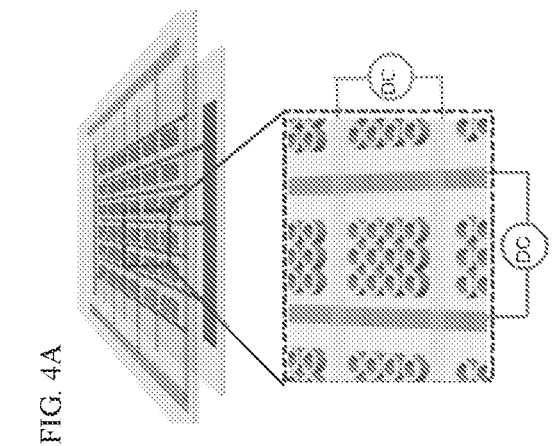

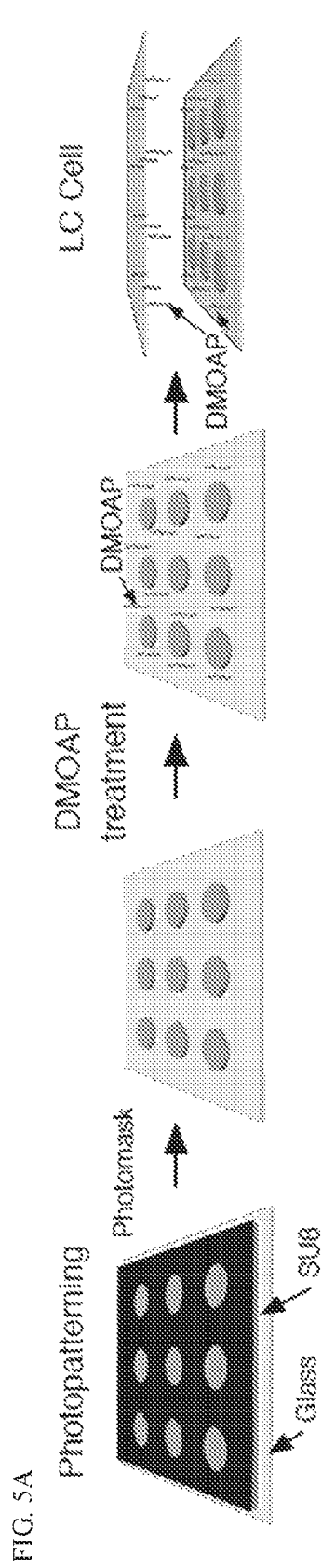
FIG. 5A
FIG. 5B
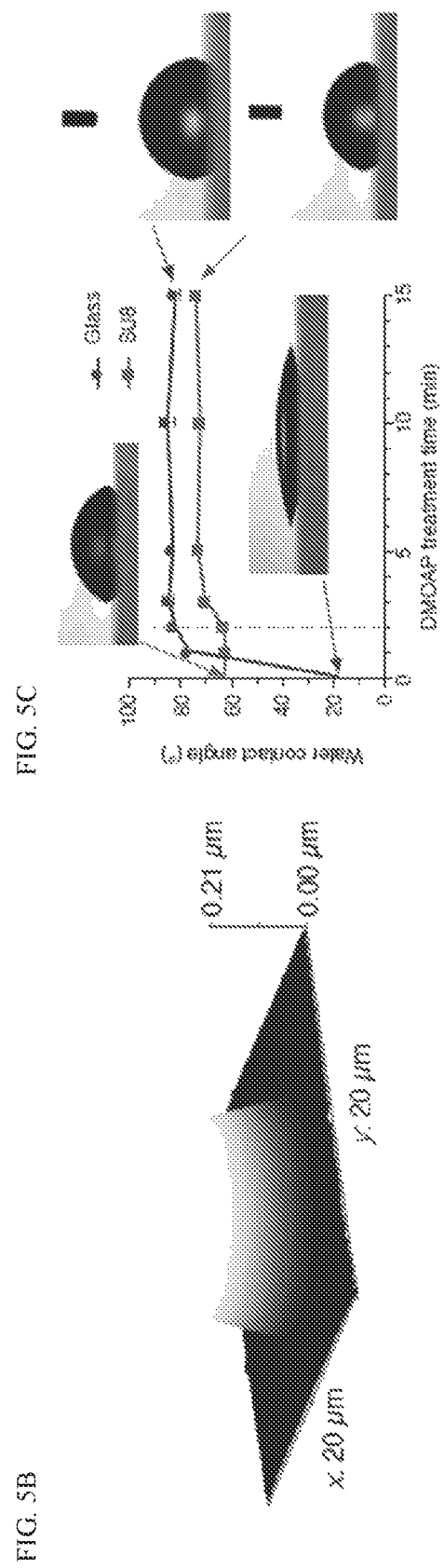
FIG. 5C

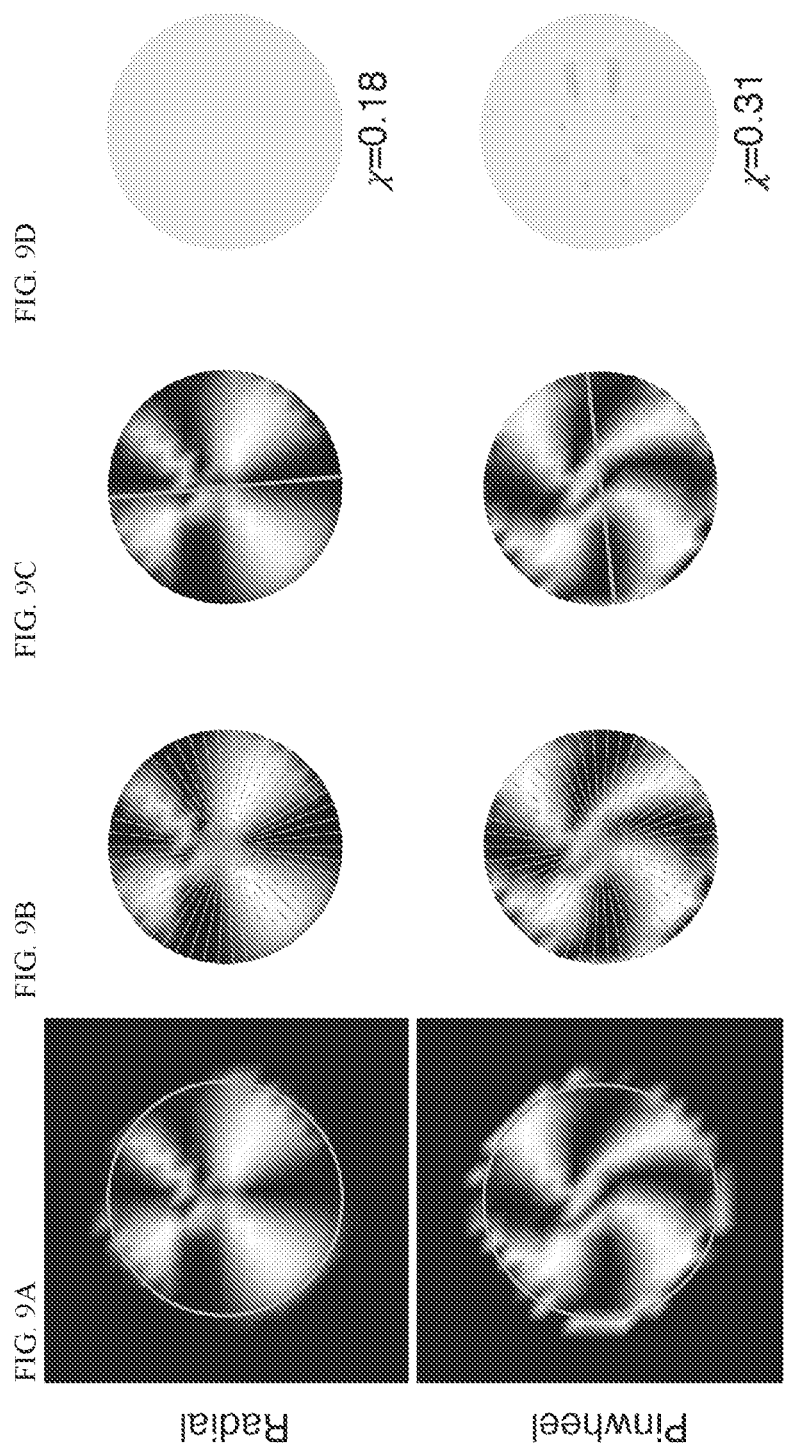

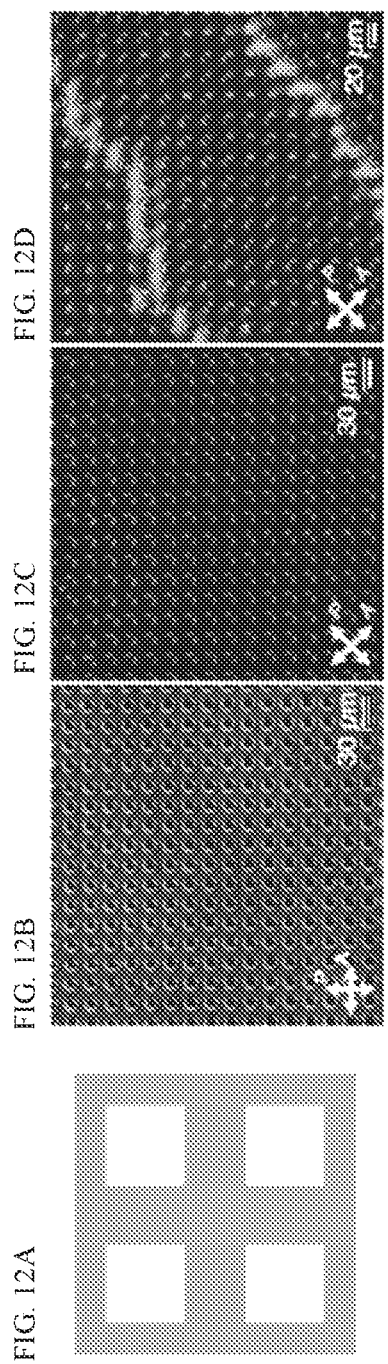

| LC | Alignment Film Surfactant | $W_a$ | Technique | Ref. |
|---|---|---|---|---|
| MBBA | SiO | $1.17 \times 10^{-5}\ J\,m^{-2}$ | Magnetic switching | Appl. Phys. Lett. 43, 62 (1983) |
| 5CB | Rubbed Polyimide | $4 \times 10^{-5}\ J\,m^{-2}$ | Electric switching | J. Appl. Phys. 57, 4520 (1985) |
| 5CB | Rubbed Polyimide (NASA LARC-TPI) | $4.50 \times 10^{-3}\ J\,m^{-2}$ | Electric switching | J. Appl. Phys. 86, 4199 (1999) |
| 5CB | Rubbed Polyimide | $5 \times 10^{-3}\ J\,m^{-2}$ | Electric switching PLCM | J. Appl. Phys. 87, 2726 (2000) |
| E7 | Lecithin | $1.2 \times 10^{-4}\ J\,m^{-2}$ | Electric switching PLCM | J. Appl. Phys. 87, 2726 (2000) |
| E7 | | $4.0 \times 10^{-3}\ J\,m^{-2}$ | Electric switching PLCM | J. Appl. Phys. 88, 6177 (2000) |
| 5CB | Moderately rubbed Nylon | $2.9 \times 10^{-5}\ J\,m^{-2}$ | Dynamic Light Scattering | Phys. Rev. E 65, 041712 (2002) |
| 5CB | Strongly Rubbed Nylon | $1 \times 10^{-4}\ J\,m^{-2}$ | | |
| 5CB | Photoalignment layer | $1.3 \times 10^{-5}\ J\,m^{-2}$ | Dynamic Light Scattering | Phys. Rev. E 68, 041704 (2003) |
| 5CB | Rubbed Nylon | $5.15 \times 10^{-4}\ J\,m^{-2}$ | | |
| 8OCB | DMOAP | $1 \times 10^{-4}\ J\,m^{-2}$ | Dynamic Light Scattering | Liq. Cryst. 33 (5) 581 (2006) |

FIG. 16 ized as that chosen cardinal state. FIG. 4F provides the schematic showing energy landscape for this multistable system.

PROGRAMMING EMERGENT SYMMETRIES WITH SADDLE-SPLAY ELASTICITY

CROSS-REFERENCE TO RELATED APPLICATIONS

The present application is the National Stage Application of International Patent Application No. PCT/US2020/020875 (filed Mar. 4, 2020), which claims priority to and the benefit of U.S. patent application No. 62/813,627, "Programming Emergent Symmetries With Saddle-Splay Elasticity" (filed Mar. 4, 2019), the entireties of which foregoing applications are incorporated herein by reference for any and all purposes.

GOVERNMENT RIGHTS

This invention was made with government support under Contract No. DMR-1720530 awarded by the National Science Foundation/MRSEC and under Contract No. DMR-1654283 awarded by the National Science Foundation. The government has certain rights in the invention.

TECHNICAL FIELD

The present disclosure relates to the field of liquid crystal optoelectronic devices.

BACKGROUND

Liquid crystal (LC) materials with controllable birefringence are used in a variety of devices. e.g., flat screen displays and portable devices. To switch the optoelectronic properties, however, it is desirable to have fast switching, low switching field, and multiple stable states with memory. It requires special LC materials, or sophisticated fabrication steps to create a substrate that provides special anchoring behaviors to LC materials. Accordingly, there is a long-felt need in the art for improved LC-based devices.

SUMMARY

In meeting the described long-felt needs, the present disclosure provides, inter alia, a multi-stable switching device, comprising: one or more supports, the one or more supports optionally comprising a surface treatment; a liquid crystal material disposed on the one or more supports; and an electric field source.

Also provided are methods, comprising: with a device comprising one or more supports and a liquid crystal disposed on the one or more supports, the liquid crystal defining a stable first symmetry state on at least one of the one or more supports; applying an electric field to the liquid crystal such that the liquid crystal defines a second stable symmetry state.

Further provided are devices, comprising: one or more supports, the one or more supports optionally comprising a surface treatment; a liquid crystal material disposed on the one or more supports; and the liquid crystal defining first stable symmetry state on at least one of the one or more supports.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIGS. 1A-1L show liquid crystals on circular posts. FIG. 1A shows distorted director field with saddle-splay rich region indicated in red, FIG. 1B shows a schematic of director reorientation over the top of a post. Liquid crystal is increasingly free to reorient with post height above the surface. FIGS. 1C-1J show stationary liquid crystal configurations with horizontal sections through the director field at the top of the post (FIGS. 1C-1F), simulated polarized optical microscope images (insets) and three-dimensional reconstructions (FIGS. 1G-1J) colored by energy density. Post height is h=0.2 μm for (FIGS. 1C-1E), and h=2 μm for FIG. 1F. FIGS. 1K-1L show experimentally observed pinwheel and boojum structures in 5CB (4-cyano-4'-pentylbiphenyl), respectively.

FIGS. 2A-2G show spontaneous chiral symmetry breaking for 8CB (4'-octyl-4-biphenylcarbonitrile) on circular posts. POM images of 8CB on (FIG. 2A) 0.2 μm and (FIG. 2B) 2.0 μm posts at various temperatures. Both samples were slowly heated (1° C./min) from smectic phase to nematic phase.

FIG. 2C provides a schematic of the smectic layers adopted by 8CB on top of a SU8 post, forming a toroidal focal conic domain (TFCD). Within a TFCD, radial in-plane LC director is strongly imposed. FIG. 2D provides frequency histograms of quantitative chirality measurements for 8CB at 34° C. in the nematic phase over 40 posts. The magnitude of the chirality is influenced by the post height, such that short posts induce greater chiral symmetry breaking. FIGS. 2E-2G provide simulated POM images of 8CB alignment at 34° C. as a function of saddle-splay constant ($K_{24}/K_{22}$) and SU8 surface anchoring strength. Blue dash boxes indicate structures consistent with experiment, and the intersection of these three regions is highlighted in red.

FIGS. 3A-3M provide periodic annular posts. FIG. 3A provides a schematic of an annuli pattern, showing several periods. FIG. 3B provides experimental observation and FIG. 3C provides a simulation of 5CB on an array of touching annuli. An extended array of −½ defects forms and breaks the pattern symmetry. FIGS. 3D-3L provide calculated director profiles (FIGS. 3D, 3G, 3J) at the top of post, (FIGS. 3E, 3H, 3K) simulated POM images and (FIGS. 3F, 3I, 3L) director profiles throughout the cell for $$W = 8 \frac{\mu J}{m^2}$$

and FIGS. 3D-3F $K_{24}/K_{22}$=0.7, FIGS. 3G-3I $K_{24}/K_{22}$=1 (the value that best agrees with experiment) and FIGS. 3J-3L $K_{24}/K_{22}$=1.9. FIG. 3M provides simulated microscope images of 5CB on periodic annular posts as a function of saddle-splay constant $K_{24}/K_{22}$ and surface anchoring strength. The parameter pairing that best agrees with experiment is highlighted with a red box.

FIGS. 4A-4F demonstrate a multistable device. FIG. 4A provides a device schematic showing electrodes and region of annuli. FIGS. 4B-4E provide a set of stable, cardinal states that may be switched into by the application of a small (0.5 V/μm) transverse, directional electric field as indicated by each yellow arrow. Each of these states remains stable upon removal of the field and any starting state can be used as a precursor to any chosen new state. FIG. 4F provides that by tuning of the applied field, the system can also access the four ordinal states, in which the defects reside along system diagonals. All scale bars are 20 μm. Insets show the simulation configuration of FIG. 4E, with the distorted regions highlighted.

FIGS. 5A-5C illustrates the fabrication process, including photolithography and surface treatment. FIG. 5A provides a schematic illustration of the sample preparation process. Different color indicates different material: grey—photomask, green—SU8, red—DMAOP. Mono-layer of DMOAP is coated on glass through surface treatment in solution. The final LC cell is constructed with one chemically-patterned glass (bottom) and the other DMOAP-coated nonpatterned glass (top). FIG. 5B provides an atomic force microscopy (AFM) measurement of a single SU8 circle on glass. FIG. 5C provides water contact angle measurements of glass and SU8 with different DMOAP treatment times. Insets are optical microscopy (OM) images of water drops on the sample surface. Green dotted line indicates the optimized DMOAP treatment time (2 min). Right panels show OM images of water drops on SU8 (top panel) and glass (bottom panel) after 2 min DMOAP treatment.

FIGS. 9A-9D provide chirality measurement $\chi$ from simulation. FIG. 9A provides simulated POM images of the radial (top) and pinwheel (bottom) configurations overlaid with a circle showing the region used to determine the image chirality. FIG. 9B provides that the region of interest is isolated and the reflection symmetry is calculated about 100 bisecting lines (25 lines shown). FIG. 9C provides that the most favorable symmetry axis is chosen from all the trials. FIG. 9D provides a heat map of the pixel intensity difference between the original and reflected images; cyan regions indicate a norm close to unity. The integral of this difference, normalized by area, gives $\chi$.

FIG. 10A provides a polarizing microscope image (POM) of 5CB in contact with trefoil posts. FIG. 10B provides a section through a calculated structure with defect located at the center of the trefoil. FIG. 10C provides a structure with defect centered on one of the disks. Insets: Simulated POM images for each structure FIGS. 11A-11B provide images of 5CB on posts with different shapes. Top panels in FIGS. 11A-11B show designs and scanning electron microscopy (SEM) images of the patterns, and bottom panels for FIGS. 11A-11B provide POM images of 5CB on posts with shape of a square (FIG. 11A) and a four-panel clover (FIG. 11B).

FIGS. 12A-12C provide 5CB on array of square washers. FIG. 12A provides a schematic illustration of the square washers. FIGS. 12B-12C provide POM images of 5CB on the array of square washers at 0° (FIG. 12B) and 45° (FIG. 12C) polarizer angle. FIG. 12D provides a POM image showing three meta-stable LC alignment. The blue regions demonstrate the grain boundaries between different alignments.

FIG. 13A provides structures for circular posts: Blue dash region indicates structures with chirality within 1 standard deviation of the experimentally observed average X are highlighted. FIG. 13B provides structures for annular posts where blue dash region indicates the region of parameter space where the experimentally observed two-brush texture is the ground state. The intersection of both circular and annular feasible regions is highlighted with a red box.

FIG. 15A provides that for 180° switching, the measured rising and falling times are 250 and 400 ms, respectively, and FIG. 15B provides that for 90° switching, the measured rising and falling times are 240 and 410 ms, respectively.

FIG. 16 provides exemplary literature figures.

DETAILED DESCRIPTION OF ILLUSTRATIVE EMBODIMENTS

Figure 6:
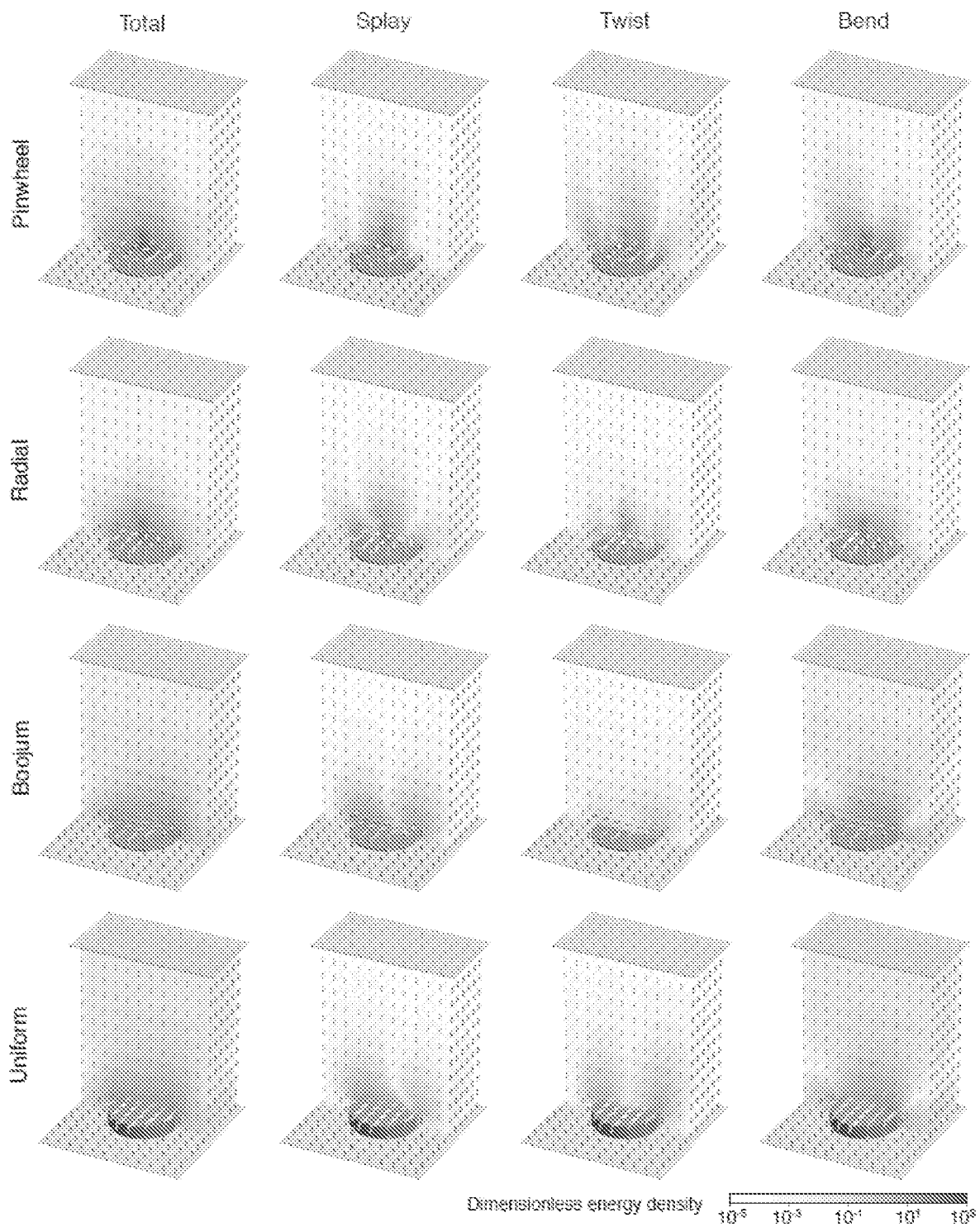
FIG. 6 provides simulated molecular alignment configurations. Calculated structures for 5CB on circular SU8 posts, colored by energy density of each elastic deformation mode. Post height is h=0.2 μm for pinwheel, radial, and boojum structures, and h=2 μm for uniform structures.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting"

as well. For example, a device that comprises Part A and Part B may include parts in addition to Part A and Part B, but may also be formed only from Part A and Part B.

In this work, we show pre-programming of broken chiral symmetries in the nematic phase of two achiral LCs (5CB and 8CB) through a ubiquitous but oft-neglected property of LCs: the "saddle-splay" elasticity. Using combinations of lithographic patterning and selective surface functionalization, we create surface patterns with spatially defined geometry and precisely controlled surface chemistry. Through this, we characterize broken symmetry regimes on a variety of surface patterns, including arrays of circular, trefoil, and annulus posts, in which saddle splay-driven effects gain physical expression. In turn, we unlock the resultant director field patterns, and identify spontaneously broken symmetries within domains exhibiting chiral and polar regimes. By fine-tuning the patterning geometry, we then program the location, energy landscape, and means of manipulation of the symmetry breaking processes. As a result, we demonstrate a multi-state stable LC display device that can be switched at an extremely low voltage density (e.g., ~0.5 V/μm).

Thin liquid crystal (LC) films with controllable birefringence underpin the dominant technology utilized in flat screen and portable displays, active optical components, switches, and storage devices. This birefringence arises from a convolution of molecular-scale polarizability anisotropies and the long-range orientational order of the constituent molecules. In any device, the stable configuration is controlled by interactions with bounding substrates, applied fields, defects and embedded components. While multistability adds further functionality, it is often associated with complex fabrication processes, exquisite control of surface conditions, high threshold voltages, and slow switching.

At the continuum level, spatial variation of an LC's orientational order is characterized by a headless vector n, the director. The Frank-Oseen free energy measures the energy cost of different kinds of director variation in the absence of defects, $$F = \tfrac{1}{2} \int [K_{11}(\nabla \cdot n)^2 + K_{22}(n \cdot \nabla \times n)^2 + K_{33}|n \times \nabla \times n|^2 - K_{24} \nabla \cdot (n \times \nabla \times n + n \nabla \cdot n)] dV$$

with four orientational elastic constants referred to as splay, twist, bend and saddle-splay in order of their appearance in Eq. (1). Where defects are present, the Landau-de Gennes approach must be used, although the correspondence between the elastic terms is nontrivial.

The first three elastic constants, $K_{11}$, $K_{22}$, and $K_{33}$, are readily measured and well understood. However, the final saddle-splay term, with associated constant $K_{24}$ (We note a number of conventions for the constant in front of the saddle-splay term exist in the literature. Here we follow in using a single constant $K_{24}$ rather than Frank's original notation, where the prefactor appears as $K_{22}+K_{24}$ (equal to $K_{24}$ in our notation)), is quite different in character to the other three: it need not be positive and hence may promote distortion, with Ericksen's stability requirements imposing a bound on its magnitude $0 < K_{24} 1 < 2 \min(K_{11}, K_{22})$; it is non-zero only if n varies in at least two orthogonal dimensions (FIG. 1A): finally, as a pure divergence, it can be integrated out to the surface of the sample and, hence, only enters the free energy through the boundary conditions, although a recent reformulation retains this term in the bulk.

These properties conspire to make $K_{24}$ notoriously difficult to measure, as a geometry is required that promotes a 3D distortion and simultaneously allows the surface anchoring energy to be measured. Hence, while the other elastic constants were measured for common LC materials decades ago, there exist to date only a handful of experimental measurements of $K_{24}$, as well as a pioneering attempt to compute $K_{24}$ directly from simulations. However, the bounds on these experimental measurements typically exceed the range allowed by stability requirements and, hence, measuring $K_{24}$ to the precision of the other LC elastic constants remains an open problem.

For most LC applications, where either surface anchoring is so strong as to prevent surface distortion, or n depends on only one or two coordinates, saddle-splay is, quite reasonably, neglected. However, saddle-splay elasticity is also known to be capable of driving a remarkably rich phenomenology, from stabilizing textures in nematic droplets or complex geometries, to promoting pattern formation in the Freedericksz transition, and "lassoing" networks of line defects in a hole array.

One strategy for creating saddle-splay distortions in a LC director field is through surface patterning. This can be either topographic, so that curvature is induced by the varying surface normal, or chemical, such that the preferred orientation axis varies across the substrate. In the absence of applied fields, surface coupling and orientational elasticity dominate LC alignment, such that varying a surface pattern can permit full control of both the preferred bulk orientation and its effective anchoring strength. Incompatibility between the surface pattern and the ordering may also promote spontaneous symmetry breaking, in which the LC adopts a surface-region configuration belonging to a subgroup of the pattern's symmetry group. Such symmetry breaking naturally produces multiple stable configurations, which can then be used as the basis of a bi- or multi-stable device.

The present disclosure provides topographic and chemical patterning to create systems that accentuate configurational dependence on saddle-splay elasticity. By varying both the shape and local alignment of the pattern, and comparing details of the resulting polarized optical microscopy (POM) images with theoretical calculations, one can narrow the feasible region for $K_{24}$. Additionally, by exploiting the resultant ability to programme spontaneous symmetry breaking by design, one can provide multistable devices founded on low-voltage switching between saddle-splay-stabilized structures.

Exemplary Posts

One exemplary system design comprises a square array of posts with period λ, where the shape and height h of the post may be varied (FIG. 1B). The tops of the posts promote planar degenerate alignment and the background surface gives vertical alignment (homeotropic anchoring). The side of each post also promotes planar degenerate alignment, compatible with the vertical anchoring where the post meets the substrate. Reorientation of the director occurs at the top edge of each post. Distortion is also caused in the surface plane by curvature of the post boundaries, thereby achieving the three-dimensional director variation required for saddle-splay.

As an example were used circular SU8 posts of diameter d=λ/2=10 μm and height h=0.2 μm, which were patterned by photolithography, followed by selective surface treatment with N. N-dimethyl-n-octadecyl-3-amino-propyltrimethoxysilyl chloride (DMOAP) (see elsewhere herein and FIG. 5A). This imposes relatively strong homeotropic anchoring on the DMOAP-coated glass regions, while maintaining planar alignment on the SU8 patterns.

Continuum elasticity calculations were performed, as described in the Methods section, to determine the corresponding stationary director configurations for given SU8 anchoring strength $W \in [3,32] \times 10^{-6}$ Jm² and $K_{24}$, while the corresponding much stronger anchoring strength for the DMOAP substrate W=315 µJ/m² was held constant.

The possible equilibrium arrangements are shown in FIGS. 1C-1E and FIGS. 1G-1I: a "pinwheel" (P) structure where the director field escapes continuously (but with spontaneous chirality) into the vertical orientation at the center of the post; a radial (R) structure with a single defect at the center of the post (in fact virtualized within it); and a boojum state (B) where a defect is localized near the post edge. For taller posts of h=2.0 µm, a fourth uniform (U) state was found (FIG. 1F, 1J) where the director is largely uniform over the post surface and oriented along the diagonal; the other states are also stationary at this taller post height. Predicted POM images were calculated for each structure as described in Methods.

Figure 7:
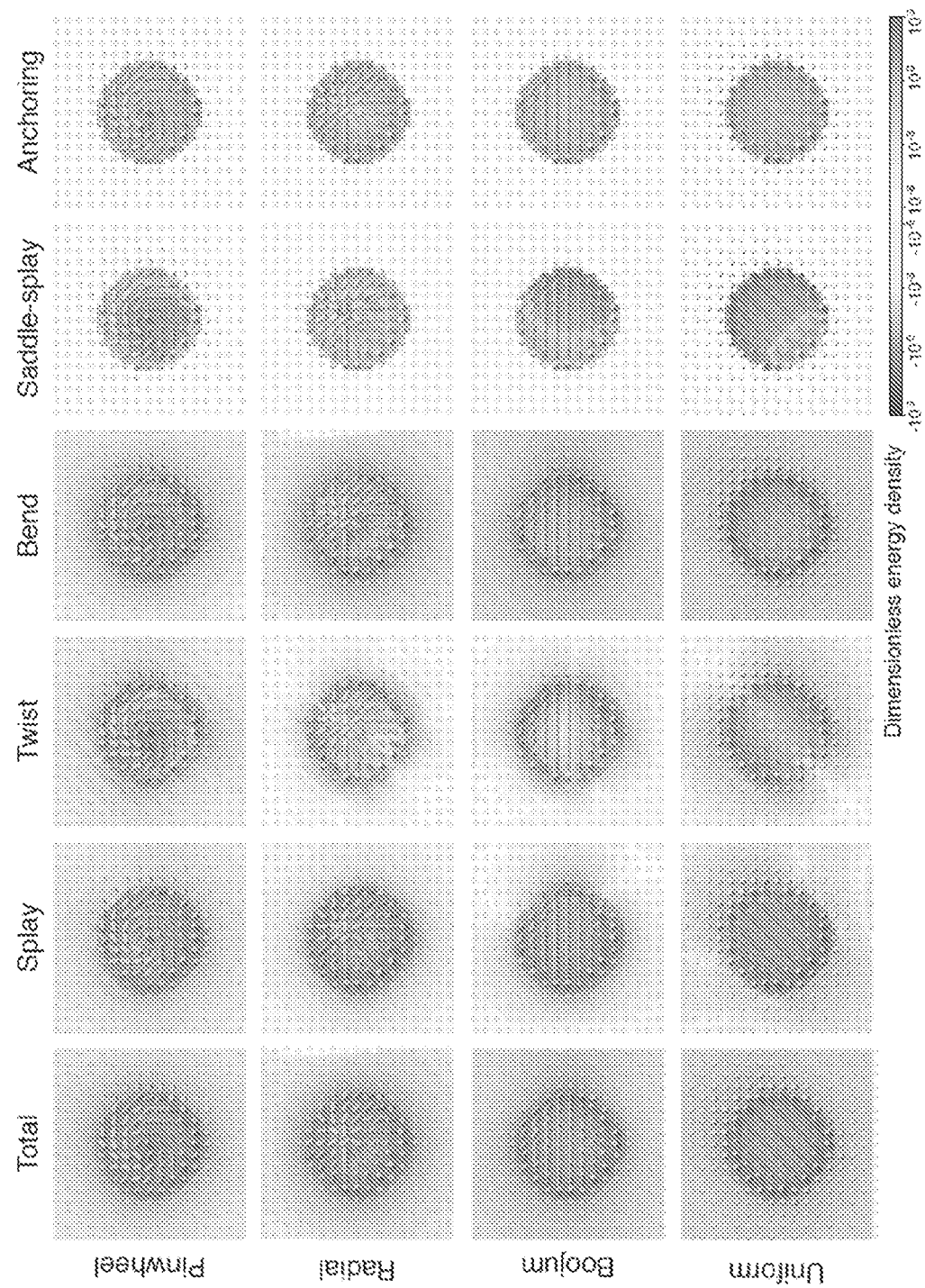
FIG. 7 provides simulated contributions to the energy of 5CB on top of circular posts. All modes of elastic deformation and surface anchoring in four types of possible configurations are plotted in colored energy density maps.

These four structures represent different compromises in meeting the boundary conditions and may be favored depending on the elastic constants and anchoring energy. The key physics driving structure selection is the distortion by which the reorientation at the top edge of the post is accomplished as shown in FIGS. 3A-3M (see also FIG. 7). We also note that for the P, R, and B states, the apparent defects are virtualized beneath the substrate on a lengthscale $K_1/W \sim 8 \times 10^{-7}$ m due to the weak anchoring for SU8. This lengthscale is much larger than the size of a defect, on the order of a few molecular lengths, a posteriori justifying use of the Frank-Oseen energy Eq. (1) which neglects gradients in the orientational order parameter.

Because the relative influence of these edge pinning lines varies with the height of the posts. This approach provides a direct experimental route for accessing the configurations identified in FIGS. 1C, 1D, 1E, and 1F. Indeed, it is this control over the effective edge pinning strength that differentiates our system from those used previously for surface-patterned LCs and, so, makes saddle-splay-stabilized configurations accessible. Further, since this experimental strategy can be extended to a variety of LC materials, surface patterns and alternative geometries, a wealth of other novel behaviors can be realized.

LC cells were prepared with a second unpatterned DMOAP-coated substrate placed on top, closed and filled with the achiral LC, 5CB (4-cyano-4'-pentylbiphenyl) (FIG. 5A), in the isotropic state, cooled into the nematic phase, imaged by POM, and then repeatedly heated into the isotropic state and re-cooled.

Figure 8:
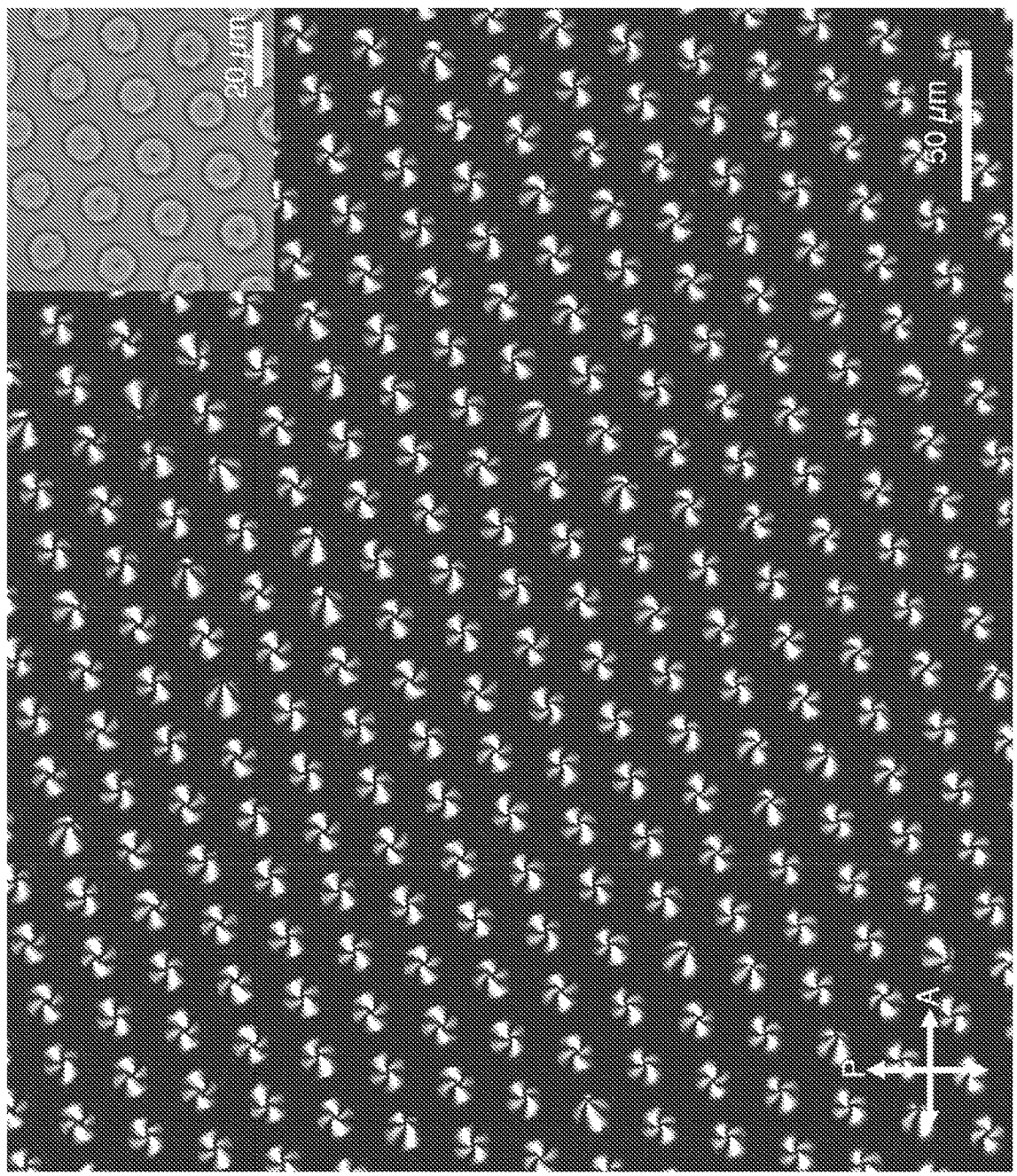
FIG. 8 provides polarized optical microscopy (POM) images of 5CB on circular posts with height of 0.2 μm. Chiral symmetry breaking with +1 defects are seen on top of the posts over a large area. Inset: Bright field (BF) image showing the topological defects of 5CB (black dots).

Two configurations, shown in FIG. 1, were observed: The first (FIG. 1K and FIG. 8) has a +1 defect over each post, displays apparent chiral symmetry breaking, and corresponds to the pinwheel (P) configuration. The second. (FIG. 1L) has a defect on the edge of each post, apparently weakly aligned with the basis vector, and corresponds to the boojum (B) structure.

While one structure or the other was adopted within each cooling cycle with high spatial uniformity—attesting to the uniformity of the patterning—the occurrence of P or B was apparently random with no evidence of memory between cycles. Without being bound to any particular theory, one can opine that, for this system, P and B lie close in energy, with kinetic differences in each cycle promoting one or the other. The R and U structures were not observed experimentally with 5CB and 0.2 µm post height, suggesting (without being bound to any particular theory) that they must be higher in energy or unstable.

Templating with Smectic Phase

To investigate this control, a cell was prepared, and closed and filled with another achiral LC 8CB (4-cyano-4'-octyl- biphenyl) in the isotropic, and cooled to 32° C., corresponding to the smectic phase. In this way, saddle-splay deformations on the post are disallowed, and the LC adopts toroidal focal conic domains (TFCDs) above the post with uniform vertical alignment between posts (note that the smectic layers are perpendicular to the director), as shown schematically in FIG. 2C and confirmed experimentally by the POM images in FIGS. 2A and 2B, representing different post heights. Using the TFCD arrangement as a starting condition enables one to template P or R structures where the defect is located in the center of the post, as the TFCD involves a radial in-plane LC director profile on the top of each post.

On gradual heating (1° C./min) into the nematic phase (34° C.), local achiral symmetry breaking is observed consistently in the POM images, with left- and right-handed twists forming on different posts with equal likelihood. As there are no molecular-level chiral interactions in these systems, one can surmise that these twists arise due to spontaneous onset of the saddle-splay-stabilized P structure (FIG. 1B). One can calculate, from images of each post, a measure of structural chirality as described below and in FIGS. 15A-15B. As is evident from FIG. 2D, the magnitude of this structural chirality is sensitive to the post height: due to their reduced edge pinning strength, taller posts induce weaker chirality. On further heating, many of the pinwheels individually transition into randomly-oriented B configurations.

To fully understand these experimental observations, one can utilize simulation. Because, to knowledge, there exists no experimentally measured value of $K_{24}$ for 8CB, one can consider values across the range defined by Ericksen. Similarly, multiple values are examined for W, the anchoring strength of SU8 (the same anchoring value $W_{DMOAP}$=315 µJ/m² as before is used for DMOAP). Simulations were initiated with either a +1 defect or a uniform director configuration.

For all saddle-splay constants and SU8 anchoring strengths considered, the defect initial configuration consistently relaxed into P, whereas the uniform director always gave B. However, simulations that control post height and saddle-splay strength reveal smooth transitions between states with similar defects: the chirality of the P structure can unwind into the R structure, and the boojum of the B structure can escape to infinity to create the U structure. In absolute terms, these calculations show B to be the global minimum energy arrangement, consistent with the experimental observation of transitions from P on heating.

Predicted POM images are displayed as a function of $K_{24}$ and W in FIGS. 2E-2G.

Figures 10A, 10B, 10C:
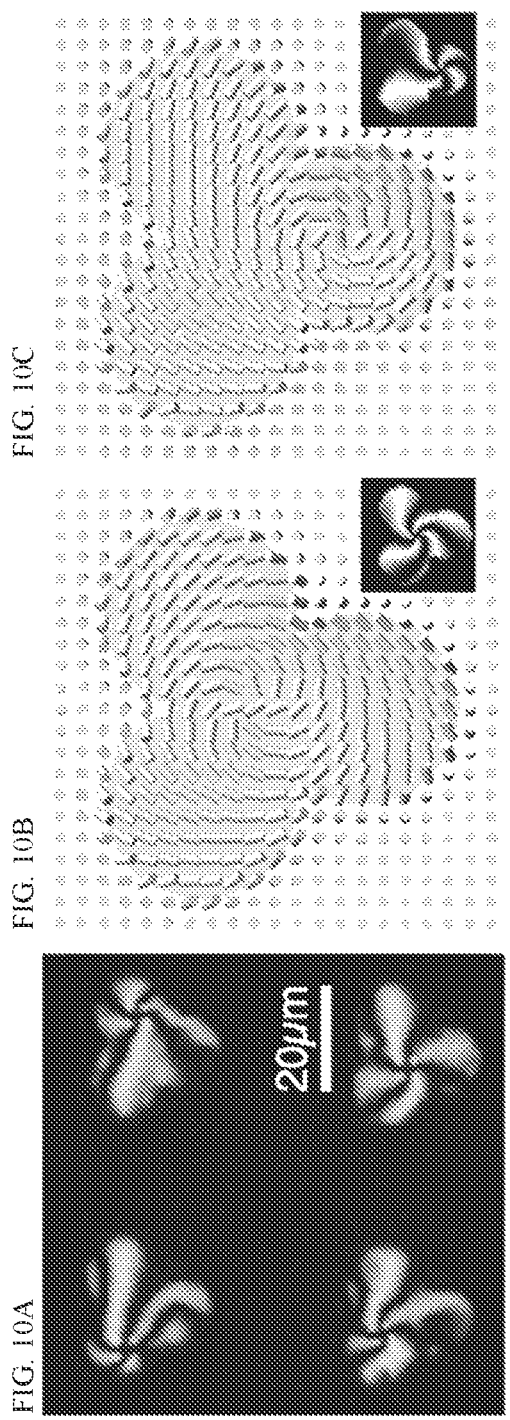
FIGS. 10A-10C provide control of defect location.
Figure 11A:
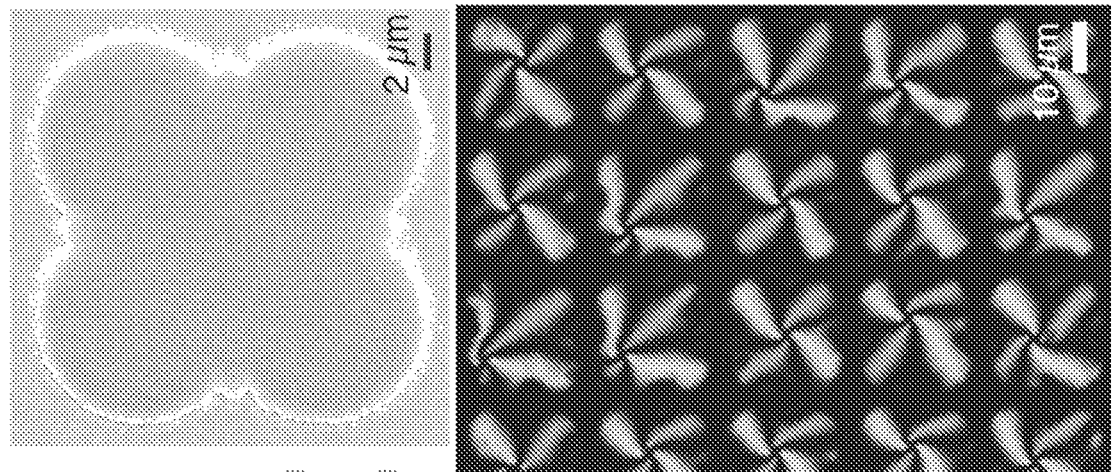
Figure 11B:
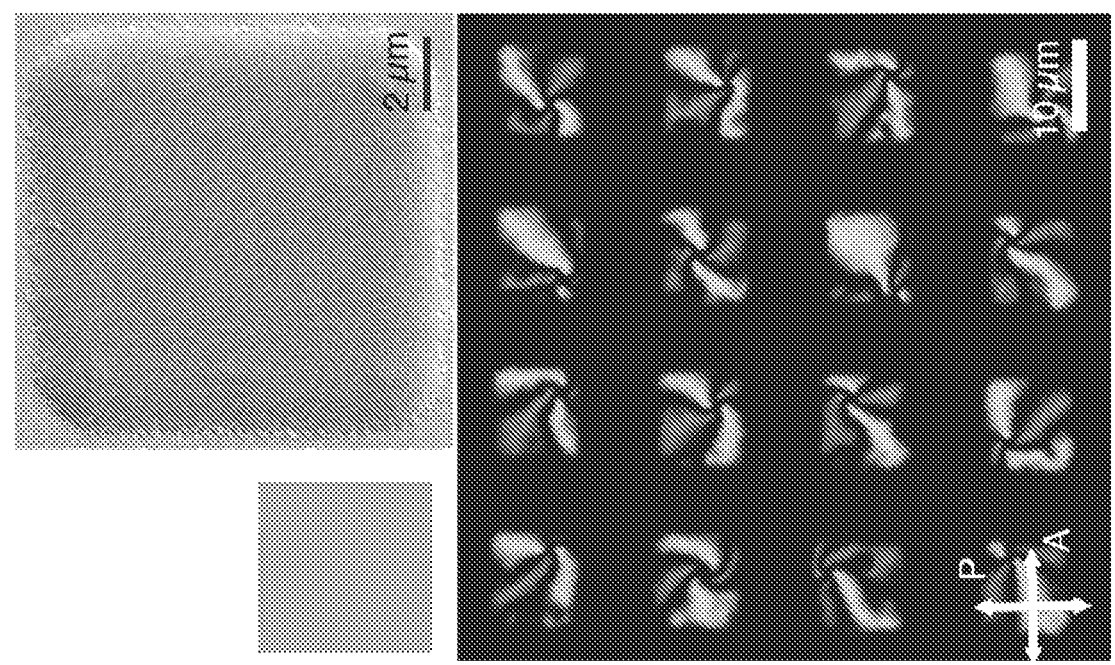

We identify regions of parameter space where simulations are consistent with experiments for each structure and post height as described in Methods and the intersection of these regions constrains $K_{24}/K_{22}$ to ~1 and W to W=8 µJ/m². Indeed, given the strong sensitivity of these structures to $K_{24}$, we suggest that measurement of pinwheel features such as these could be a viable route to determining the splay-bend elastic constant for a range of LC materials. Further, as demonstrated elsewhere herein, we can also exploit our ability to sculpt posts of arbitrary cross section to control the location of the defects and observe multistable behaviors using, e.g., trefoil (FIGS. 10A-10B), square and quatrefoil posts (FIGS. 11A-11B); here defects reside in the post centers or on one of the patterned lobes.

Annular Posts

To achieve large-scale symmetry breaking, one can consider a system with richer patterning topology: a square array of tangentially touching annuli (FIG. 3A). This was fabricated using the same materials, SU8 and DMOAP, as before. The annuli have inner and outer diameters of 10 μm and 20 μm, respectively. For annuli height of 0.2 μm, +1 defects are no longer apparent. Instead, POM imaging reveals a two-brush texture that breaks the polar symmetry of the pattern. Without being bound to any particular theory, this is suggestive of half-charge defects on the interior of each annulus and on the edge of each four-star shaped gap between adjoining annuli (FIG. 3B). Further, because the annuli are adjoining, this broken symmetry extends across multi-annulus domains.

This unusual texture is explained by the simulation results of FIGS. 3A-3M, which results show how, for this feature height, saddle-splay-stabilized −½ defects spontaneously break the fourfold symmetry of the pattern design. The calculated microscope image, FIG. 5C, corresponding to structures with $W=8$ μJ/m² and $K_{24}/K_{22}=1$, agrees well with experiment. FIGS. 3D-3L show calculated structures with constant $W=8$ μJ/m², but varying $K_{24}/K_{22}$, confirming that the structure adopted strongly depends on the latter. As this ratio is varied, the system adopts an intermediate state (FIGS. 3D-3F) if $K_{24}$ is low, and something analogous to the U state shown in FIGS. 3C, 3J, 3K, 3L, and 3M for large $K_{24}$.

For the structure whose simulated POM most closely resembles experiment, i.e., FIG. 3E, elastic distortion of the LC director field is minimal and the variation required to accommodate the curved boundary conditions accumulates near the defect area. This modest elastic distortion is, though, achieved at the cost of a break in the overall symmetry of the domain-neighboring defects are localized at the same cardinal point as one another. In a further experiment, this same symmetry breaking is also obtained using an array of square annuli (FIG. 12A)—again, with all of the −½ defects are located at the same corner of their respective square motif.

Measurement of $K_{24}$

Careful comparison between experimental and simulated textures enables one to resolve compatible values of W and $K_{24}$ as before. In FIG. 3M the simulated POM images are displayed as a function of W and $K_{24}$, showing that the experimental texture is only seen for a limited range of parameters.

Figure 13B:
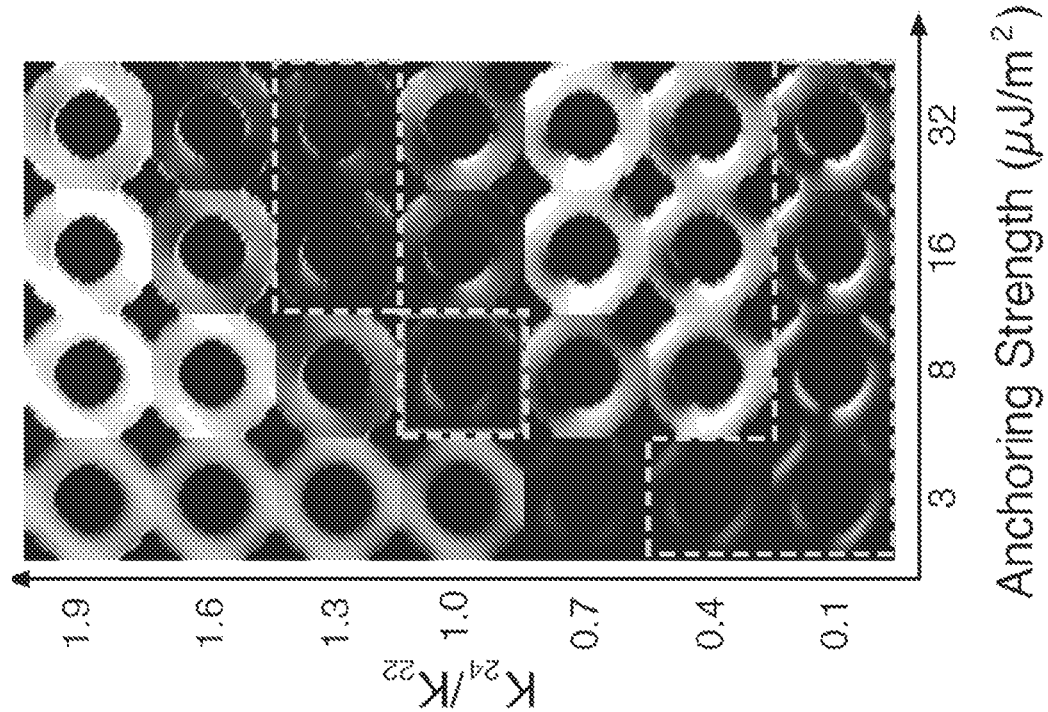
FIGS. 13A-13B provide simulated POM images of 5CB configuration as a function of saddle-splay constant ($K_{24}/K_{22}$) and SU8 surface anchoring strength.
Figure 13A:
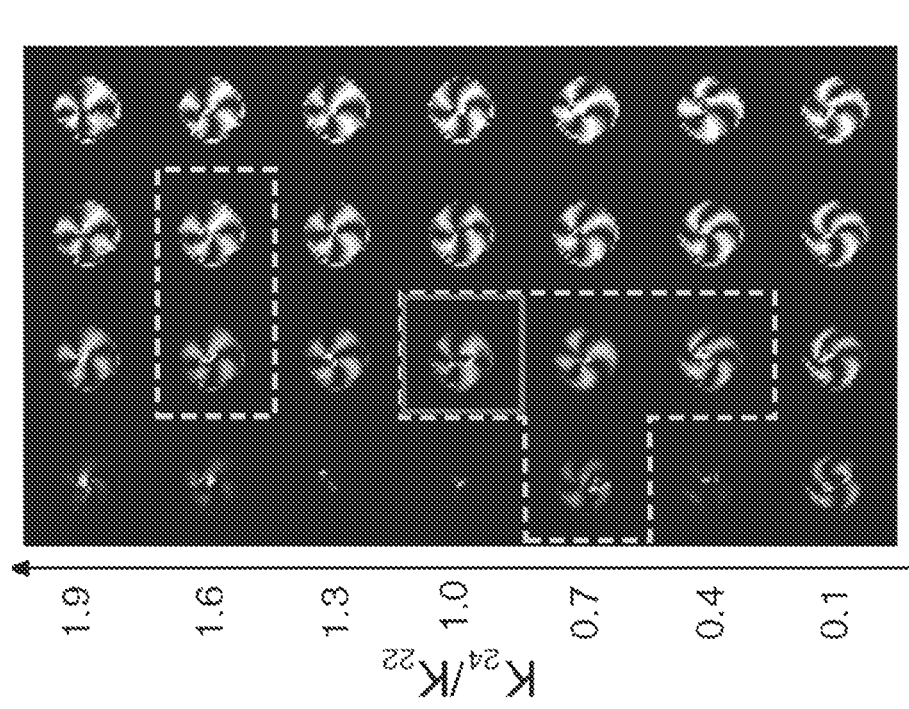

Moreover, one can combine these results with those from circular posts with 5CB to obtain a more robust estimation since each geometry exhibits a very different sensitivity to the material parameters (see FIGS. 12B-12D). The annular structure is, as remarked above, sensitive to the ratio of $K_{24}/K_{22}$. Further, a very weak anchoring scenario is excluded by the circular post structure, because here the director would escape vertically to give an indistinct texture. In FIG. 3G, therefore, one can highlight the parameter region that shows greatest consistency with experiment for annuli. Combining the two estimates (FIGS. 13A-13B) yields values of $W=8\pm3$ μJ/m² and $K_{24}/K_{22}=1\pm0.3$. For 5CB, this range of values is consistent with literature, but represents a significant narrowing of the bounds.

Multistable Device

Finally, we leverage this newfound ability to use saddle-splay effects to program symmetry breaking over large domains by creating a multistable, low-voltage, switchable LC device from arrays of annuli (FIGS. 4A-4F and FIG. 14). To achieve this, we construct a cell with patterned Cu electrodes on each substrate to apply in-plane electric fields (FIG. 4A). Annuli of height 0.2 μm (5×10 annuli in each array) are patterned on the bottom substrate with the same surface treatment as in FIGS. 3A-3M.

Figure 15A:
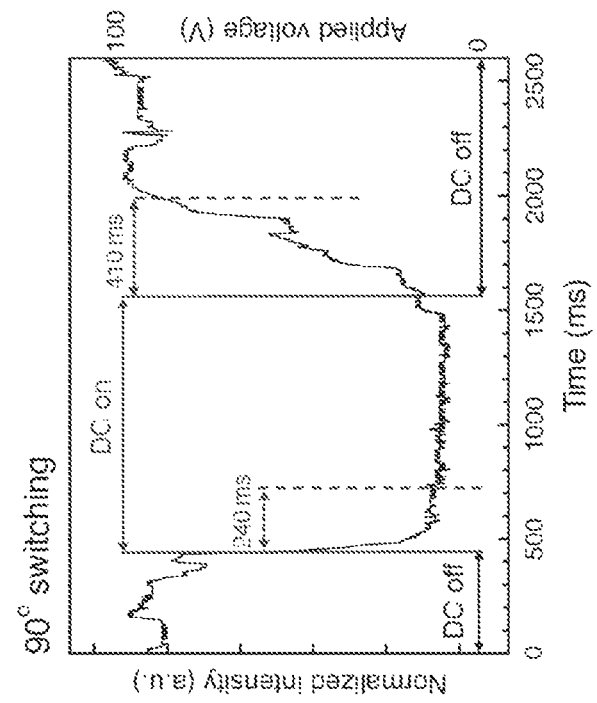
FIGS. 15A-15B provide response times of an exemplary multistable device.
Figure 15B:
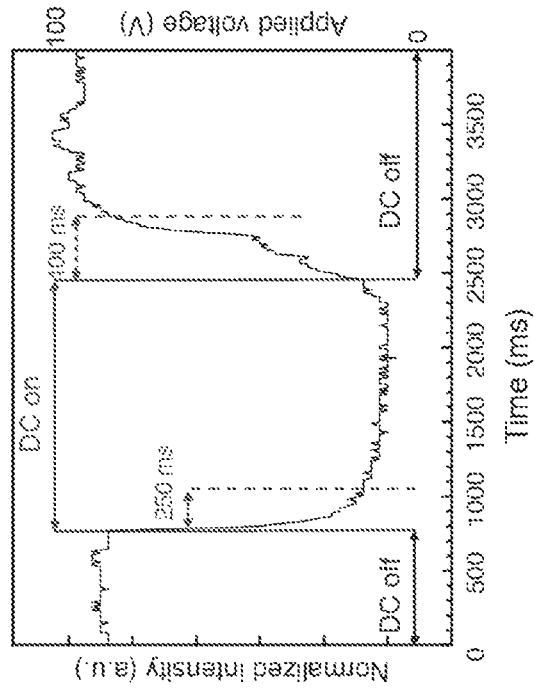

The initial state of such cells is set by the symmetry of the patterned surface, the defects always picking out one of the cardinal compass points, e.g., north-to-south shown in FIG. 4B. Switching between these is then readily achieved by an in-plane electric field (FIGS. 4B-4E). Response times are measured as described herein, and found to be 250 ms (rising) and 400 ms (falling) for 180° switching, and 240 ms (rising) and 410 ms (falling) for 90° switching (FIGS. 15A-15B). All switching permutations prove straightforward, whether they require rotation of the in-plane director by 180° (e.g., from FIGS. 4B-4D) or 90° (e.g., from FIGS. 4B, 4C). Furthermore, and very unusually for an LC system, the sense of the applied field is significant—it couples to the pattern-scale polarity of the surface state, even though the underlying LC is intrinsically apolar.

Despite being non-optimized, the threshold switching electric field of ~0.5 V/μm, for all rotation types, is lower than those generally required to achieve LC switching, particularly in multi-stable systems. This is, presumably, due to the azimuthal degeneracy of the LCs on the isotropic annuli, energy barriers between the states corresponding to the relocation of the topological defects around each annulus. In other multistable LC technologies, switching requires defects to be either created or annihilated, thereby incurring a high energetic cost. In contrast, here the −½ defects are present in all states, stabilizing the domain-wide symmetry against thermal fluctuations and in-plane flow and, so, delivering multi-stability. Indeed, with careful tuning of the applied electric field, the local symmetry breaking can go beyond the four native stable states (the cardinal points), to additionally include further stable states along the four diagonals (the ordinal points) of the arrays of annuli (FIG. 4F).

Discussion

Our results show that saddle-splay effects, routinely suppressed in LC systems, can be realized using substrates that combine topographical and chemical patterning. Indeed, it is shown that such behaviors are actually rather general, being accessible to standard LC materials and across a range of pattern geometries. Additional physical effects such as order parameter gradients and flexoelectricity can be useful for other geometries and surface treatments.

Saddle-splay effects in confined LCs manifest as modifications to the surface-region director field configurations and defects. These include spontaneous emergence of locally chiral and polar arrangements, which offer a route to experimental measurement of the (historically challenging) elastic constant $K_{24}$. For patterns such as touching annuli, however, an even more exciting behavior is seen: the emergent symmetry breaking is no longer localized, but extends across domains. Thus, the intrinsically apolar LC adopts surface director field patterns with regular polar defects which couple to directional DC fields. Indeed, when harnessed in this way, they provide the basis for a novel class of multi-stable (e.g., octo-stable) optical devices with comparatively low switching fields.

Now having shown the novel capabilities opened up by consideration of saddle-splay effects in a basic sandwich-geometry cell, $K_{24}$ coupling opens control of behavior in LCs with nanoparticle or colloidal inclusions, LCs confined in bicontinuous 3D periodic structures, or LCs containing complex defect arrays. These include routes to controlling complex self aggregation, novel structured dielectric media, and low-energy data storage functionality.

Methods

The following disclosure is illustrative only and does not limit the scope of the present disclosure or the appended claims.

N,N-dimethyl-n-octadecyl-3-amino-propyltrimethoxysilyl chloride (DMOAP), gamma-butyrolactone and propylene glycol monomethyl ether acetate (PGMEA) were purchased from Sigma-Aldrich and used as received. 4-cyano-4'-pentylbiphenyl (5CB) and 4-cyano-4'-octylbiphenyl (8CB) were purchased from Kingston Chemicals Limited. Negative-tone photoresist, SU8-2, was purchased from MicroChem Corporation. and positive-tone photoresist, S1813, was purchased from Dow Chemical Company.

Continuum Theory Simulations

The computational domain is periodic in the x and y directions with side $\Lambda=20$ μm and $d=25$ μm tall; the post height is 20 μm. The free energy to be minimized consists of bulk elastic $f_{el}=\frac{1}{2}[K_1(\nabla \cdot n)^2+K_2(n \cdot \nabla \times n)^2+K_3|n \times \nabla \times n|^2]$, surface-like saddle-splay elasticity $-\frac{1}{2}K_{24}[n \times \nabla \times n + n \nabla \cdot n] \cdot \hat{s}$ and anchoring contributions $\pm W(n \cdot n_e)^2/2$ where n is the cartesian director $n=(n_x, n_y, n_z)$ and $\hat{s}$ is the outward surface normal. $K_1$, $K_2$, and $K_3$ correspond to splay, twist, and bend deformations, respectively, and $K_{24}$ is the saddle-splay constant. W is the anchoring coefficient. The choice of sign in the anchoring term gives either alignment with an easy axis $n_e$ if negative or planar degenerate alignment if $n_e$ is chosen to be $\hat{s}$ and if positive. This energy is nondimensionalised and discretized using finite differences onto a 31×31×30 grid and a nonuniform grid spacing is used in the z direction, concentrating additional mesh points around the post: to ensure stability on the nonuniform grid first order finite differences are used. The length constraint $n \cdot n=1$ is imposed locally by Lagrange multipliers. Grid points inside the posts are omitted and boundary conditions are imposed as follows: on the top substrate, vertical alignment is imposed; on the bottom surface, vertical boundary conditions are imposed outside the posts, and planar degenerate conditions are imposed on the side and top of the posts.

Parameters used are as follows: in the absence of an experimental measurement, the vertical DMOAP anchoring coefficient was chosen by setting the dimensionless parameter $\Gamma=W\lambda/K_1=1$ yielding $W=3.15\times10^{-4}$ Jm$^{-2}$, which corresponds to strong anchoring; this is the same order of magnitude to the measurement of $W=1\times10^{-4}$ Jm$^{-2}$ for 8OCB in DMOAP's. In addition, calculations were repeated for values of $W_{DMOAP}$ in the range $1-10\times10^{-4}$ Jm$^{-2}$ and found not to perturb the calculated structures, and hence the measured value of $K_{24}$ significantly. For SU8 anchoring coefficients on the interval $W=[3,32]$μj/m$^2$ are used, spanning a similar range to experimental measurements of 5CB alignment on other surfaces that promote weak zenithal anchoring such as weakly rubbed nylon, photoalignment layers, rubbed polyimide, and silicon oxide (see FIG. 16). We also note that no evidence of elastic instabilities that might occur for sufficiently weak anchoring were observed.

Experimentally measured liquid crystal elastic constants are used based on room temperature: for 5CB, $K_1=6.3$ pN, $K_2=4.3$ pN, $K_3=9.6$ pN are used; for 8CB $K_1=7.1$ pN, $K_2=3.3$ pN, $K_3=10.7$ pN. For both materials, $K_{24}$ is varied over the entire interval allowed by the Ericksen inequalities.

The energy is minimized by a gradient descent scheme with line searches and adaptive step size and the process repeated until the energy converges to the relative change per iteration is <10$^{-6}$. Sample configurations, broken down by splay, twist and bend energy are displayed in FIGS. 7 and 8.

Preparation of Surface Topographical Patterns

Surface topographical patterns were fabricated from photoresist SU8 using conventional photolithography (FIG. 5A). Glass substrates were pre-cleaned by rinsing with acetone three times, followed by drying with an air gun.

For 0.2 μm patterns, commercial photoresist SU8-2 was diluted four times with gamma-butyrolactone, followed by spin-coating (4,000 rpm for 40 s) on a clean glass substrate. The sample was then prebaked at 95° C. for 1 min, and exposed to 365 nm UV light (Newport model 97436-1000-1, Hg source) through a photomask with a dosage of 200 mJ/cm2. After post-baking at 95° C. for 1 min, the sample was developed by PGMEA to obtain the final SU8 pattern. The 2 μm patterns were prepared through a similar procedure with undiluted SU8-2 and a slightly lower spin-coating velocity at 2,000 rpm for 40 s.

Surface Chemistry Modification

In all, 3 vol % DMOAP solution was prepared in a mixture of water/ethanol (1:9 v/v). For non-patterned glass substrates, they were immersed in DMOAP solution for 30 min. For SU8 patterned glasses, DMOAP treatment was varied to find the optimal condition to generate homeotropic anchoring in non-patterned region while maintaining SU8 patterned region planar. The DMOAP treated substrates were washed with deionized (DI) water three times and baking at 110° C. in a convection oven for 1 h.

Water Contact Angle Measurement

To monitor the DMOAP coating kinetics, flat SU8 film was prepared without surface pattern as a comparison to glass substrate in the reaction with DMOAP (FIG. 5C). Both the SU8 film and glass substrate were treated by DMOAP solution, and water contact angle was measured as a function of DMOAP treatment time. For water contact angle measurement, a 5 μL water droplet was placed on the sample surface from Ramé-Hart standard automated goniometer (model 200) using the sessile drop method. For each water contact angle reported, it was averaged over three measurements at different locations of the sample.

Preparation of Liquid Crystal Cells

Liquid crystal cells were constructed from one glass slide with chemical patterns and the other one as DMOAP treated non-patterned substrate. The thickness of the LC cells was controlled using a Mylar spacer (~5 μm thick). LCs were then infiltrated into the cells through capillary filling. To remove the mechanical and thermal history of the LC, samples were heated on a hot stage to the isotropic phase (35° C. for 5CB and 42° C. for 8CB) and maintained for 1 min, followed by slowly cooling down (1° C./min) to the desired temperature for the anchoring study with optical microscopy (Olympus BX61).

Chirality Calculations

For a given image the circular region of interest (ROI) on top of the post is identified and denoted I (see FIG. 9A). The ROI is reflected about an arbitrary axis passing through the center of the post to produce a new image I' and the chirality about this axis is calculated $\chi 0 \Sigma_{ij}(I-I')/\Sigma_{ij}$ where the sums are over pixels in the region of interest. The axis which produces the smallest value of $\chi$ is then chosen from 100 orientationally equally spaced axes (see FIGS. 9B, 9C). The normalization constant $\chi 0$ is then chosen to map observed values onto the range [0, 1].

Parameter Estimation

The saddle-splay constant and SU8 anchoring strength are estimated by comparing simulated POM images across a range of parameters to experimentally observed structures, yielding feasible regions highlighted with blue dash lines in FIGS. 5E-5G and FIGS. 13A-13B. For pinwheel structures on circular posts, the chirality χ of both experimental and simulated structures is calculated as described above. Experimental images give distributions as shown in FIG. 5D from which the mean experimental chirality is calculated as $\bar{\chi}$ for a given post height. We then select the region of parameter space where the simulated χ is within 1 standard deviation of $\bar{\chi}$: these regions are highlighted in FIGS. 5F, 5G and FIG. 13A. For boojum and uniform structures on circular posts, the region where the experimentally observed boojum state is observed is highlighted in FIG. 5E. For the annular posts, the region of parameter space where the simulated structures reproduce the two-brush texture observed experimentally. This region is highlighted in FIG. 13B. The intersection of the three feasible regions of parameter space for 8CB on circular posts is then taken and outlined with red solid lines on FIGS. 5E-5G; the corresponding region for 5CB is shown in FIG. 13 using both circular and annular posts. Our final quoted values of $K_{24}$ for 5CB represent the extent of the feasible region in FIG. 13B.

Preparation of Multi-Stable Device

Figure 14:
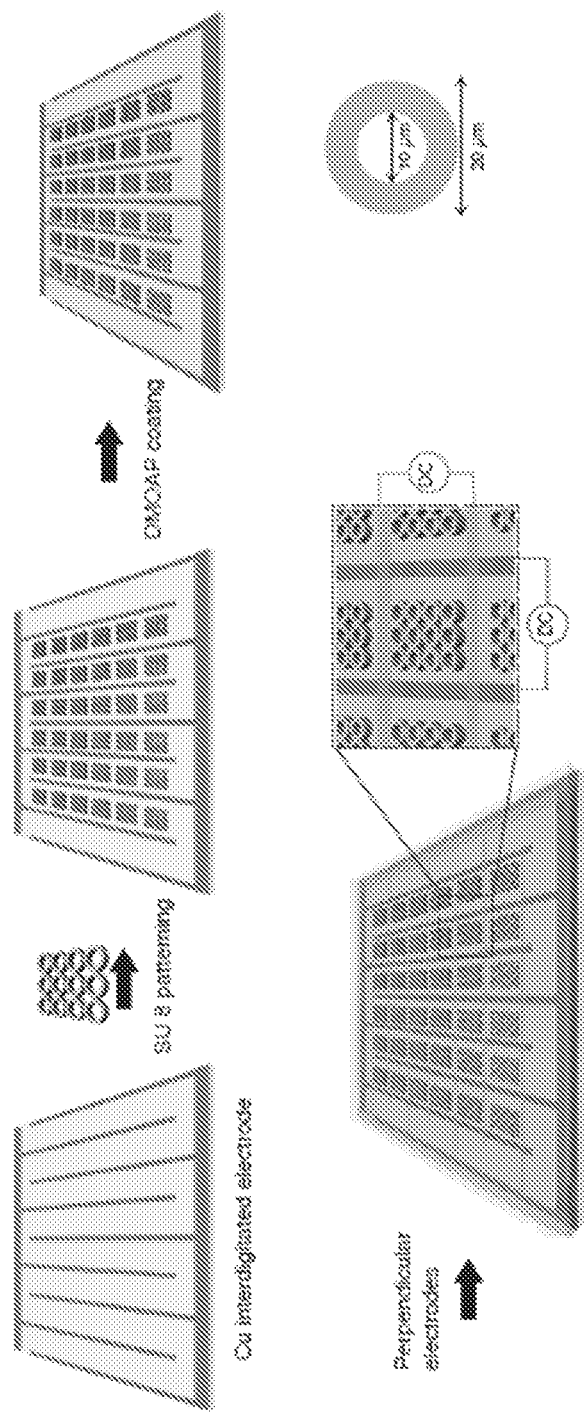
FIG. 14. Fabrication of multistable device. Periodic annular posts were photo-patterned between the interdigital Cu electrodes. Then, the substrate was chemically treated by DMOAP. The DMOAP treated patterned electrodes were orthogonally sandwiched with ~25 micrometer gap, in which infiltrated LC can be switched in four ways by the application of a transverse DC field.

To study multi-stability of our annuli device, a LC cell was constructed by one surface with chemical patterns, and the other surface with a patterned Cu electrode that applied the demanding in-plane electric field for LC director switching (see schematic in FIGS. 4A and 14).

To prepare patterned Cu electrodes, pre-cleaned microscope glass slides were sputtered with Cu for 1 min to obtain a thickness ~80 nm. Positive-tone photoresist S1813 was then spin-coated (2000 rpm for 40 s) on the Cu-sputtered glass, followed by pre-baking on a hot plate at 110 Â° C. C for 1 min. Next, the sample was exposed to 365 nm UV light at the Newport Hg light source though a photomask at a dosage of 200 mJ/cm2, followed by developing in MF-319 solution to obtain the electrode pattern. The sample was then etched in 0.3% Cu etchant and rinse with DI water.

For DMOAP coating, the sample can be coated with a thin layer of SiO2 though a chemical vapor deposition (CVD) process: the patterned Cu substrate was kept in a desiccator under vacuum in the presence of silicon tetrachloride (SiCl$_4$, 0.2 mL) for 10 min. Then the sample was treated with water vapor in a humidity chamber (humidity ~90%) for 10 min. After washing with ethanol and DI water, respectively, for three times, the patterned Cu electrode was coated with DMOAP, followed by drying by an air gun and baking at 110° C. in a convection oven for 15 min.

To construct a multi-stable LC cell, the chemical pattern and the Cu electrode were aligned under an ABM mask aligner, with the thickness of the LC cell controlled by a Mylar spacer (~25 μm thick). 5CB was then infiltrated into the LC cell through capillary filling. To remove the mechanical and thermal history of 5CB, samples were heated on a hot stage to 35° C. to the isotropic phase and maintained for 1 min, followed by slowly cooling down (1° C./min) to room temperature for the anchoring study with optical microscopy.

Multi-Stable Switching

To study multi-stability, an in-plane DC electric field was applied through the Cu electrode and maintained for ~1 s, following by characterization of LC texture under a POM. The voltage of the applied electric field was increased from 10V to 110 V at an interval of 10V. A voltage of 100V (electric field strength=0.5V/μm) was identified as the minimal requirement for switching the multi-stable device.

Response Time Measurement

Dynamic responses of the device are measured using a white light emitting diode (LED) light and a photoresistor (purchased from Elegoo Inc.) in conjunction with the driving circuits (parts also purchased from Elegoo Inc.). The device is placed between two crossed polarizers and transmittance curves were obtained under the applied voltage with the amplitude of 100 V using a DC power supply (HP 6515A). The rising and falling times were estimated from the normalized transmittance curves (from 10 to 90% and vice versa) and they were measured as 250 and 400 ms for 180° switching and 240 and 410 ms for 90° switching, respectively.

Characterization

Liquid crystal alignment was characterized by an Olympus BX61 motorized optical microscope with crossed polarizers using CellSens software. Sample annealing was carried out on a Mettler FP82 and FP90 thermo-system hot stage under ambient condition. SEM imaging was performed on a dual beam FEI Strata DB 235 Focused Ion Beam (FIB)/SEM instrument with 5 KV electron-beam AFM imaging was performed on a Bruker Icon AFM.

Embodiments

The following embodiments are illustrative only and do not limit the scope of the present disclosure or the appended claims Embodiment 1. A multi-stable switching device, comprising: one or more supports, the one or more supports optionally comprising a surface treatment: a liquid crystal material disposed on the one or more supports; and an electric field source.

Surface treatments can include, e.g., a coupling agent, a surfactant, and the like. Silane/silyl surface treatments are considered suitable.

Embodiment 2. The device of Embodiment 1, wherein (a) in a first state of the device, the liquid crystal defines a first stable symmetry state on at least one of the one or more supports, and (b) in a second state of the device, the liquid crystal defines a second stable symmetry state on the at least one of the one or more supports.

Embodiment 3. The device of Embodiment 2, wherein the device is configured such that application of an electric field by the electric field source effects a change in the liquid crystal from the first stable symmetry state to the second stable symmetry state.

Embodiment 4. The device of Embodiment 3, wherein the electric field is directional.

Embodiment 5. The device of any one of Embodiments 2-4, wherein the change from the first state to the second state is characterized as being persistent following removal of the electric field.

Embodiment 6. The device of any one of Embodiments 2-5, wherein the electric field source is configured to apply an electric field in more than one direction.

Embodiment 7. The device of any one of Embodiments 2-6, wherein in a third state of the device, the liquid crystal defines a third stable symmetry state on the at least one of the one or more supports.

Embodiment 8. The device of Embodiment 7, wherein the device is configured such that application of an electric field by the electric field source effects a change in the liquid crystal from the first stable symmetry state to the third stable symmetry state or from the second stable symmetry state to the third stable symmetry state.

Embodiment 9. The device of any one of Embodiments 2-7, wherein the electric field is less than about 2.5 V/μm.

Embodiment 10. The device of Embodiment 8, wherein the electric field is less than about 2.0 V/μm.

Embodiment 11. The device of any one of Embodiments 2-10, wherein the first stable symmetry state is any of pinwheel, radial, boojum, or uniform.

Embodiment 12. The device of any one of Embodiments 1-11, wherein the one or more supports are spaced from one another in a periodic fashion.

Embodiment 13. The device of any one of Embodiments 1-12, wherein the one or more supports comprise a circular cross-section, an annular cross-section, a polygonal cross-section, a lobed cross-section, an ovoid cross-section, or any combination thereof.

Embodiment 14. The device of any one of Embodiments 1-13, comprising two or more supports, the two or more supports contacting one another.

Embodiment 15. The device of any one of Embodiments 1-14, wherein the device is characterized as an optoelectronic switch.

Embodiment 16. The device of any one of Embodiments 1-15, wherein the device further comprises a source of illumination in optical communication with the liquid crystal.

Embodiment 17. The device of any one of Embodiments 1-16, wherein the liquid crystal is characterized as chiral.

Embodiment 18. The device of any one of Embodiments 1-16, wherein the liquid crystal is characterized as achiral.

Embodiment 19. The device of any one of Embodiments 1-18, wherein the electric field source comprises a plurality of electrodes.

Embodiment 20. The device of any one of Embodiments 2-19, wherein the liquid crystal defines a plurality of stable symmetry states. As described elsewhere herein, one or more of the plurality of stable symmetry states can be persistent following removal of an applied electric field.

Embodiment 21. A method, comprising: with a device comprising one or more supports and a liquid crystal disposed on the one or more supports, the liquid crystal defining a stable first symmetry state on at least one of the one or more supports: applying an electric field to the liquid crystal such that the liquid crystal defines a second stable symmetry state.

Embodiment 22. The method of Embodiment 21, wherein the electric field is a directional electric field.

Embodiment 23. The method of any one of Embodiments 21-22, wherein the electric field is less than about 2.5 V/µm.

Embodiment 24. The method of any one of Embodiments 21-23, wherein the first stable symmetry state is any of pinwheel, radial, boojum, or uniform.

Embodiment 25. The method of any one of Embodiments 21-24, wherein the first stable symmetry state is any of pinwheel, radial, boojum, or uniform.

Embodiment 26. The method of any one of Embodiments 21-25, wherein the one or more supports are spaced from one another in a periodic fashion.

Embodiment 27. The method of any one of Embodiments 21-26, wherein one or more of the one or more supports comprises a circular cross-section, an annular cross-section, a polygonal cross-section, a lobed cross-section, an ovoid cross-section, or any combination thereof.

Embodiment 28. The method of any one of Embodiments 21-27, wherein two or more of the one or more supports contact one another.

Embodiment 29. A device, comprising: one or more supports, the one or more supports optionally comprising a surface treatment: a liquid crystal material disposed on the one or more supports; and the liquid crystal defining first stable symmetry state on at least one of the one or more supports.

Embodiment 30. The device of Embodiment 29, wherein the first stable symmetry state is any of pinwheel, radial, boojum, or uniform.

Embodiment 31. The device of any one of Embodiments 29-30, wherein one or more of the one or more supports comprises a circular cross-section, an annular cross-section, a polygonal cross-section, a lobed cross-section, an ovoid cross-section, or any combination thereof.

Embodiment 32. The device of any one of Embodiments 29-31, further comprising a directional electric field source, the directional electric field source being configured to apply a directional electric field to the liquid crystal such that application of an electric field by the electric field source effects a change in the liquid crystal from the first stable symmetry state to a second symmetry state.

Embodiment 33. The device of Embodiment 32, wherein the directional electric field source comprises a plurality of electrodes.

Embodiment 34. The device of any one of Embodiments 29-32, wherein the liquid crystal is chiral.

Embodiment 35. The device of any one of Embodiments 29-32, wherein the liquid crystal is achiral.

Embodiment 36. A method, comprising: effecting breakage of a stable state of a material; and determining, from one or more of a visualization of the liquid material and a parameter associated with the breakage, a saddle-splay constant value of the material.

The material can be, e.g., a polymeric material, a liquid crystal, or any combination thereof. Exemplary parameters can be, e.g., temperature, an applied gradient (e.g., voltage), and the like. The material can be disposed on a support, e.g., a cylindrical column, an annular column, a trefoil (in cross-section) column, a quad-lobed (in cross-section) column, a square (in cross-section) column, and the like. The saddle-splay constant can be $K_{24}/K_{22}$.

The following references are incorporated herein by reference in their entireties. The listing of a reference, however, is not necessarily an acknowledgment that the reference is prior art or in any way material to the patentability of the disclosed technology.

1. Hilsum, C. Flat-panel electronic displays: a triumph of physics, chemistry and engineering. *Proc. R Soc. A* 368, 1027-1082 (2010).
2. Smalyukh, I. I., Lansac, Y., Clark, N. A. & Trivedi, R. P. Three-dimensional structure and multistable optical switching of triple-twisted particle-like excitations in anisotropic fluids. *Nat. Mater.* 9, 139-145 (2010).
3. Poulin, P., Stark. H., Lubensky, T. & Weitz, D. Novel colloidal interactions in anisotropic fluids. *Science* 275, 1770-1773 (1997).
4. Araki, T., Buscaglia, M., Bellini. T. & Tanaka, H. Memory and topological frustration in nematic liquid crystals confined in porous materials. *Nat. Mater.* 10, 303-309 (2011).
5. Kim, D. S., Čopar, S., Tkalec, U. & Yoon, D. K. Mosaics of topological defects in micropatterned liquid crystal textures. *Sci. Adv.* 4, eaau8064 (2018).
6. Ong, H. L., Meyer, R. B. & Hurd, A. J. Multistable orientation in a nematic liquid crystal cell induced by external field and interfacial interaction. *J. Appl. Phys.* 55, 2809-2815 (1984).
7. Kim, J.-H., Yoneya, M. & Yokoyama, H. Tristable nematic liquid-crystal device using micropatterned surface alignment. *Nature* 420, 159-162 (2002).
8. Serra, F., Buscaglia, M. & Bellini, T. The emergence of memory in liquid crystals. *Mater. Today* 14, 488-494 (2011).
9. Tsakonas, C., Davidson, A. J., Brown, C. V. & Mottram. N. J. Multistable alignment states in nematic liquid crystal filled wells. *Appl. Phys. Lett.* 90, 111913 (2007).

10. Hendrikx, M. et al. Re- and preconfigurable multistable visible light responsive surface topographies. *Small* 14, e0803274 (2018).
11. Jones, J. C. The Zenithal bistable display: from concept to consumer. *J. Soc. Inf. Disp.* 16, 143-154 (2008).
12. Tiribocchi, A., Gonnella, G., Marenduzzo, D. & Orlandini, E. Switching and defect dynamics in multistable liquid crystal devices. *Appl. Phys. Lett.* 97, 143505 (2010).
13. Davidson, A. J., Brown, C. V., Mottram, N. J., Ladak, S. & Evans, C. R. Defect trajectories and domain-wall loop dynamics during two-frequency switching in a bistable azimuthal nematic device. *Phys. Rev. E, Stat., Nonlinear, Soft Matter Phys.* 81, 051712 (2010).
14. Spencer, T. J., Care, C. M., Amos, R. M. & Jones, J. C. Zenithal bistable device: comparison of modeling and experiment. *Phys. Rev. E* 82, 37-13 (2010).
15. Stewart, I. *The Static and Dynamic Continuum Theory of Liquid Crystals: A Mathematical Introduction* (Taylor and Francis, New York, 2004).
16. Frank, F. C. I. Liquid crystals. On the theory of liquid crystals. *Discuss. Faraday Soc.* 25, 19-10 (1958).
17. Oseen, C. W. The theory of liquid crystals. *Trans. Faraday Soc.* 29, 883-899 (1933).
18. Allender, D., Crawford, G. & Doane, J. Determination of the liquid-crystal surface elastic constant $K_{24}$. *Phys. Rev. Lett.* 67, 1442-1445 (1991).
19. umer, S. & Kralj, S. Influence of K24 on the structure of nematic liquid crystal droplets. *Liq. Cryst.* 12, 613-624 (1992).
20. Polak, R. D., Crawford, G. P., Kostival, B. C., Doane, J. W. & umer, S. Optical determination of the saddle-splay elastic constant. *Phys. Rev. E* 49, R978-R981 (1994).
21. Ericksen, J. L. Inequalities in liquid crystal theory. *Phys. Fluids* 9, 1205-1207 (1966).
22. Selinger, J. V. Interpretation of saddle-splay and the Oseen-Frank free energy in liquid crystals. *Liq. Cryst. Rev.* 6, 129-142 (2018).
23. Crawford, G., Allender, D. & Doane, J. Surface elastic and molecular-anchoring properties of nematic liquid crystals confined to cylindrical cavities. *Phys. Rev. A. At., Mol., Optical Phys.* 45, 8693-8708 (1992).
24. Ondris-Crawford, R., Crawford, G., umer, S. & Doane, J. Curvature-induced configuration transition in confined nematic liquid crystals. *Phys. Rev. Lett.* 70, 194-197 (1993).
25. Lavrentovich, O. & Pergamenshchik, V. Stripe domain phase of a thin nematic film and the K13 divergence term. *Phys. Rev. Lett.* 73, 979-982 (1994).
26. Sparavigna, A., Lavrentovich, O. D. & Strigazzi, A. Periodic stripe domains and hybrid-alignment regime in nematic liquid crystals: Threshold analysis. *Phys. Rev. E* 49, 1344-1352 (1994).
27. Pairam, E. et al. Stable nematic droplets with handles. *Proc. Natl Acad. Sci. USA* 110, 9295-9300 (2013).
28. Davidson, Z. S. et al. Chiral structures and defects of lyotropic chromonic liquid crystals induced by saddle-splay elasticity. *Phys. Rev. E* 91, G18-5 (2015).
29. Cestari, M., Bosco, A. & Ferrarini, A. Molecular field theory with atomistic modeling for the curvature elasticity of nematic liquid crystals. *J. Chem. Phys.* 131, 054104-17 (2009).
30. Sidky, H., dePablo, J. J. & Whitmer, J. K. In Silico Measurement of Elastic Moduli of Nematic Liquid Crystals. *Phys. Rev. Lett.* 120, 107801 (2018).
31. Kos, . & Ravnik, M. Relevance of saddle-splay elasticity in complex nematic geometries. *Soft Matter* 12, 1313-1323 (2016).
32. Kralj, S., Rosso, R. & Virga. E. G. Periodic saddle-splay Freedericksz transition in nematic liquid crystals. *Eur. Phys. J. E* 17, 37-44 (2005).
33. Tran, L. et al. Lassoing saddle splay and the geometrical control of topological defects. *Proc. Natl Acad. Sci. USA* 113, 7106-7111 (2016).
34. DeBenedictis, A. et al. Competition of lattice and basis for alignment of nematic liquid crystals. *Phys. Rev. E* 92, 880-10 (2015).
35. Kitson, S. & Geisow, A. Controllable alignment of nematic liquid crystals around microscopic posts: Stabilization of multiple states. *Appl. Phys. Lett.* 80, 3635-3637 (2002).
36. Madhusudana, N. V. & Pratibha, R. Elasticity and orientational order in some cyanobiphenyls: part IV. Reanalysis of the data. *Mol. Cryst. Liq. Cryst.* 89, 249-257 (2006).
37. Zhang, J., Boamfa, M. I., Rowan, A. E. & Rasing, T. Compartmentalized multistable liquid crystal alignment. *Adv. Mater.* 22, 961-965 (2009).
38. Škarabot, M., Osmanagič, E. & Muševič, I. Surface anchoring of nematic liquid crystal 80CB on a DMOAP-silanated glass surface. *Liq. Cryst.* 33, 581-585 (2006).
39. Vilfan. M., Mertelj, A. & Čopič, M. Dynamic light scattering measurements of azimuthal and zenithal anchoring of nematic liquid crystals. *Phys. Rev. E* 65, 33-7 (2002).
40. Vilfan, M. & Čopič, M. Azimuthal and zenithal anchoring of nematic liquid crystals. *Phys. Rev. E* 68, 33-5 (2003).
41. Nastishin, Y. A., Polak. R. D., Shiyanovskii, S. V., Bodnar. V. H. & Lavrentovich, O. D. Nematic polar anchoring strength measured by electric field techniques. *J. Appl. Phys.* 86, 4199-4213 (1999).
42. Yokoyama, H. & vanSprang, H. A. A novel method for determining the anchoring energy function at a nematic liquid crystal-wall interface from director distortions at high fields. *J. Appl. Phys.* 57, 4520-4526 (1985).
43. Xia, Y, DeBenedictis, A., Kim, D., Chen, S., Cleaver, D., Atherton, T., and Yang, S. Programming Emergent Symmetries With Saddle Splay Elasticity. *Nature Communications,* 10, 5104 (2019).

What is claimed:
1. A multi-stable switching device, comprising:
   one or more supports, the one or more supports comprising a surface treatment;
   a liquid crystal material disposed on the one or more supports; and
   an electric field source.
2. The device of claim 1, wherein (a) in a first state of the device, the liquid crystal defines a first stable symmetry state on at least one of the one or more supports, and (b) in a second state of the device, the liquid crystal defines a second stable symmetry state on the at least one of the one or more supports.
3. The device of claim 2, wherein the device is configured such that application of an electric field by the electric field source effects a change in the liquid crystal from the first stable symmetry state to the second stable symmetry state.
4. The device of claim 2, wherein change from the first state to the second state is characterized as being persistent following removal of the electric field.

5. The device of claim 2, wherein in a third state of the device, the liquid crystal defines a third stable symmetry state on the at least one of the one or more supports.

6. The device of claim 5, wherein the device is configured such that application of an electric field by the electric field source effects a change in the liquid crystal from the first stable symmetry state to the third stable symmetry state or from the second stable symmetry state to the third stable symmetry state.

7. The device of claim 2, wherein the first stable symmetry state is any of pinwheel, radial, boojum, or uniform.

8. The device of claim 2, wherein the liquid crystal defines a plurality of stable symmetry states.

9. The device of claim 1, wherein the one or more supports are spaced from one another in a periodic fashion.

10. The device of claim 1, wherein the one or more supports comprise a circular cross-section, an annular cross-section, a polygonal cross-section, a lobed cross-section, an ovoid cross-section, or any combination thereof.

11. The device of claim 1, wherein the device is characterized as an optoelectronic switch.

12. The multi-stable switching device of claim 1, wherein the surface treatment comprises at least one of a surfactant and a coupling agent.

13. The multi-stable switching device of claim 1, wherein the surface treatment comprises a silane or silyl.

14. The multi-stable switching device of claim 1, wherein the supports extend from a first substrate, and wherein the multi-stable switching device defines a space between the first substrate and a second substrate, the liquid crystal being disposed in the space.

* * * * *

UNITED STATES PATENT AND TRADEMARK OFFICE
CERTIFICATE OF CORRECTION

PATENT NO. : 12,038,667 B2
APPLICATION NO. : 17/435407
DATED : July 16, 2024
INVENTOR(S) : Shu Yang et al.

It is certified that error appears in the above-identified patent and that said Letters Patent is hereby corrected as shown below:

On the Title Page

In Other Publications,

Under Column no. 2, Page 2, Line no. 13, Replace:
"al., Stripe domain"
With:
--al., "Stripe domain--

Under Column no. 2, Page 2, Line no. 14, Replace:
"divergence term, Physical"
With:
--divergence term," Physical--

In the Specification

Under Column no. 1, Line no. 33, Replace:
"of devices. e.g.,"
With:
--of devices, e.g.,--

Under Column no. 5, Line no. 42, Replace:
"$d\nabla$"
With:
--$dV$--

Under Column no. 5, Line no. 58, Replace:
"$0<K_{24}1$"

Signed and Sealed this
Third Day of September, 2024

*Katherine Kelly Vidal*
Katherine Kelly Vidal
*Director of the United States Patent and Trademark Office*

With:
--$0 < |K_{24}|$--

Under Column no. 5, Line no. 60, Replace:
"(FIG. 1A): finally,"
With:
--(FIG. 1A); finally,--

Under Column no. 6, Line no. 60, Replace:
"with N. N-dimethyl"
With:
--with N, N-dimethyl--

Under Column no. 7, Line no. 1, Replace:
"Jm² and K₂₄,"
With:
--$Jm^{-2}$ and $K_{24}$,--

Under Column no. 7, Line no. 50, Replace:
"The second. (FIG."
With:
--The second, (FIG.--

Under Column no. 10, Line no. 62, Replace:
"geometry cell."
With:
--geometry cell,--

Under Column no. 11, Line no. 12, Replace:
"MicroChem Corporation. and positive"
With:
--MicroChem Corporation, and positive--

Under Column no. 11, Line no. 29, Replace:
"and discretized using"
With:
--and dis-cretized using--

Under Column no. 11, Line no. 31, Replace:
"the post: to"
With:
--the post; to--

Under Column no. 11, Line no. 45, Replace:
"for 8OCB in"

CERTIFICATE OF CORRECTION (continued)
U.S. Pat. No. 12,038,667 B2

With:
--for 8OCB in--

Under Column no. 11, Line no. 46, Replace:
"in DMOAP's. In"
With:
--in DMOAP[38]. In--

Under Column no. 11, Line no. 50, Replace:
"[3,32]µj/m²"
With:
--[3,32]µJ/m²--

Under Column no. 11, Line no. 58, Replace:
"$K_1$=6. 3 pN, $K_2$"
With:
--$K_1$=6.3 pN, $K_2$--

Under Column no. 11, Line no. 59, Replace:
"$K_1$=7. 1 pN, $K_2$"
With:
--$K_1$=7.1 pN, $K_2$--

Under Column no. 11, Line no. 65, Replace:
"is <$10^{-6}$. Sample"
With:
--is $10^{-6}$. Sample--

Under Column no. 13, Line no. 7, Replace:
"$\overline{\chi}$:"
With:
--$\overline{\chi}$;--

Under Column no. 14, Line no. 17, Replace:
"electron-beam AFM"
With:
--electron-beam. AFM--

Under Column no. 14, Line no. 25, Replace:
"surface treatment: a"
With:
--surface treatment; a--

Under Column no. 15, Line no. 35, Replace:
"more supports: applying"

CERTIFICATE OF CORRECTION (continued)
U.S. Pat. No. 12,038,667 B2

With:
--more supports; applying--

Under Column no. 15, Line no. 61, Replace:
"surface treatment: a"
With:
--surface treatment; a--

Under Column no. 16, Line no. 39, Replace:
"Proc. R Soc."
With:
--Proc. R. Soc.--

Under Column no. 16, Line no. 45, Replace:
"P., Stark. H.,"
With:
--P., Stark, H.,--

Under Column no. 16, Line no. 48, Replace:
"M., Bellini. T."
With:
--M., Bellini, T.--

Under Column no. 16, Line no. 65, Replace:
"V. & Mottram. N."
With:
--V. & Mottram, N.--

Under Column no. 17, Line no. 3, Replace:
"14, e0803274 (2018)."
With:
--14, e1803274 (2018).--

Under Column no. 17, Line no. 29, Replace:
"umer, S."
With:
--Žumer, S.--

Under Column no. 17, Line no. 33, Replace:
"umer, S."
With:
--Žumer, S.--

Under Column no. 17, Line no. 43, Replace:
"Rev. A. At.,"

With:
--Rev. A, At.,--

Under Column no. 17, Line no. 45, Replace:
"umer, S."
With:
--Žumer, S.--

Under Column no. 18, Line no. 1, Replace:
"Kos .. & Ravnik,"
With:
--Kos. Ž. & Ravnik,--

Under Column no. 18, Line no. 4, Replace:
"R. & Virga. E."
With:
--R. & Virga, E.--

Under Column no. 18, Line no. 26, Replace:
"crystal 80CB on"
With:
--crystal 8OCB on--

Under Column no. 18, Line no. 28, Replace:
"Vilfan. M.,"
With:
--Vilfan, M.,--

Under Column no. 18, Line no. 35, Replace:
"A., Polak. R."
With:
--A., Polak, R.--

Under Column no. 18, Line no. 36, Replace:
"V., Bodnar. V."
With:
--V., Bodnar, V.--